United States Patent [19]
Koike et al.

[11] Patent Number: 5,988,790
[45] Date of Patent: Nov. 23, 1999

[54] MULTIPLE ELEMENT PRINTER AND METHOD OF ADJUSTING THEREOF

[75] Inventors: Keiichi Koike; Takashi Takeda; Keiki Yamada, all of Tokyo, Japan

[73] Assignee: Mitsubishi Denki Kabushiki Kaisha, Tokyo, Japan

[21] Appl. No.: 08/834,551

[22] Filed: Apr. 4, 1997

[30] Foreign Application Priority Data

Apr. 11, 1996 [JP] Japan ................................ 8-089681
Oct. 7, 1996 [JP] Japan ................................ 8-266044

[51] Int. Cl.⁶ .................................................. B41J 2/145
[52] U.S. Cl. .................................. 347/41; 347/9; 347/12
[58] Field of Search ................................ 347/41, 12, 9

[56] References Cited

U.S. PATENT DOCUMENTS

| | | |
|---|---|---|
| 4,069,486 | 1/1978 | Fox . |
| 4,198,642 | 4/1980 | Gamblin . |
| 4,272,771 | 6/1981 | Furukawa .................... 347/41 |
| 5,760,807 | 6/1998 | Yamazaki et al. ............ 347/103 |
| 5,779,377 | 7/1998 | Kumai et al. .............. 347/41 X |

FOREIGN PATENT DOCUMENTS

| | | |
|---|---|---|
| 57176176 | 10/1982 | European Pat. Off. . |
| 0458650 | 11/1991 | European Pat. Off. . |
| 0507328 | 10/1992 | European Pat. Off. . |
| 0517543 | 12/1992 | European Pat. Off. . |
| 0679518 | 11/1995 | European Pat. Off. . |
| B2-2-9941 | 3/1990 | Japan . |

Primary Examiner—N. Le
Assistant Examiner—Hai C. Pham

[57] ABSTRACT

A multiple element printer including a printhead arranged with N of printing elements for printing dots on a surface of a receiving medium at intervals of k dots where k and N are positive integers mutually prime with each other, in a direction of feeding the receiving medium, first driving device for driving the receiving medium in the direction of feeding the receiving medium, second driving device for scanning the printhead in a direction of print lines orthogonal to the direction of feeding the receiving medium, data forming device for outputting previously stored information data for printing the information data onto a surface of the receiving medium, printing element drive signal forming device for outputting to the printhead printing element drive signals for driving the respective printing elements based on the information data such that a $1^{st}$ one of the printing elements and an Nth one of the printing elements alternately printing the dots at odd ordinal numbers and the dots at even ordinal numbers on substantially the same print lines and controlling device for controlling the first driving device such that the receiving medium is moved by a distance of P dots where N=P+1 at every printing and scanning of the printhead in the direction of the print lines.

7 Claims, 28 Drawing Sheets

FIGURE 10
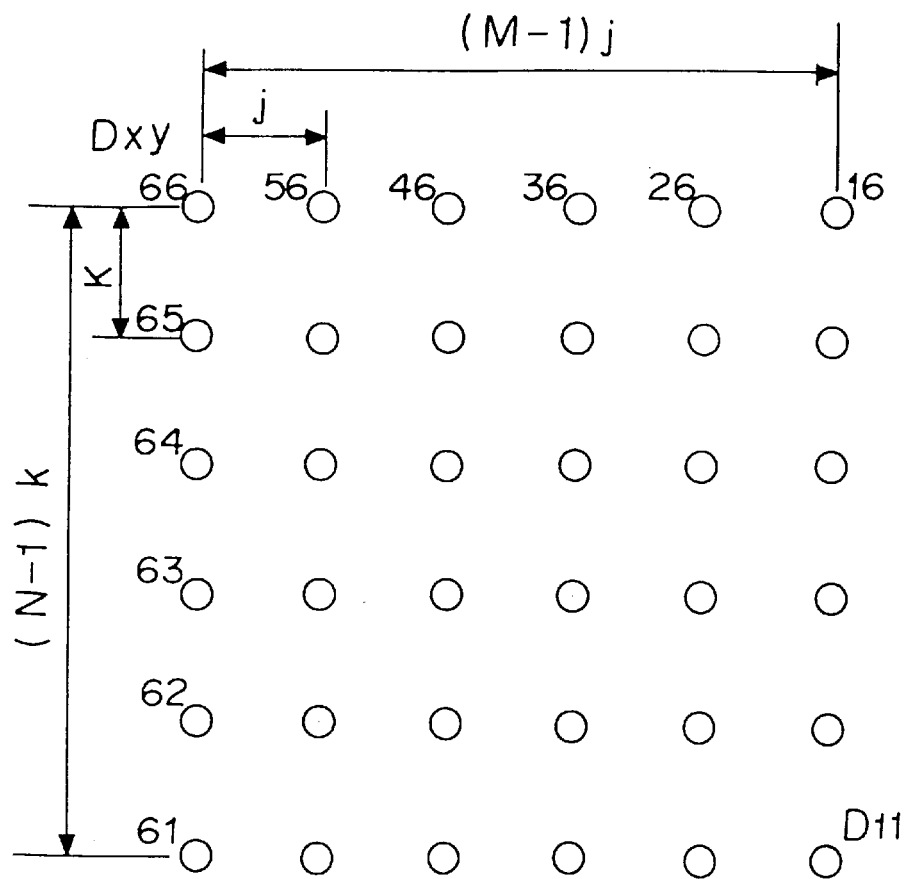
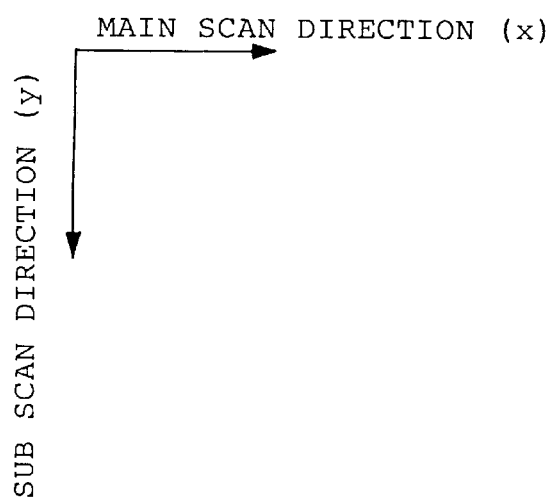

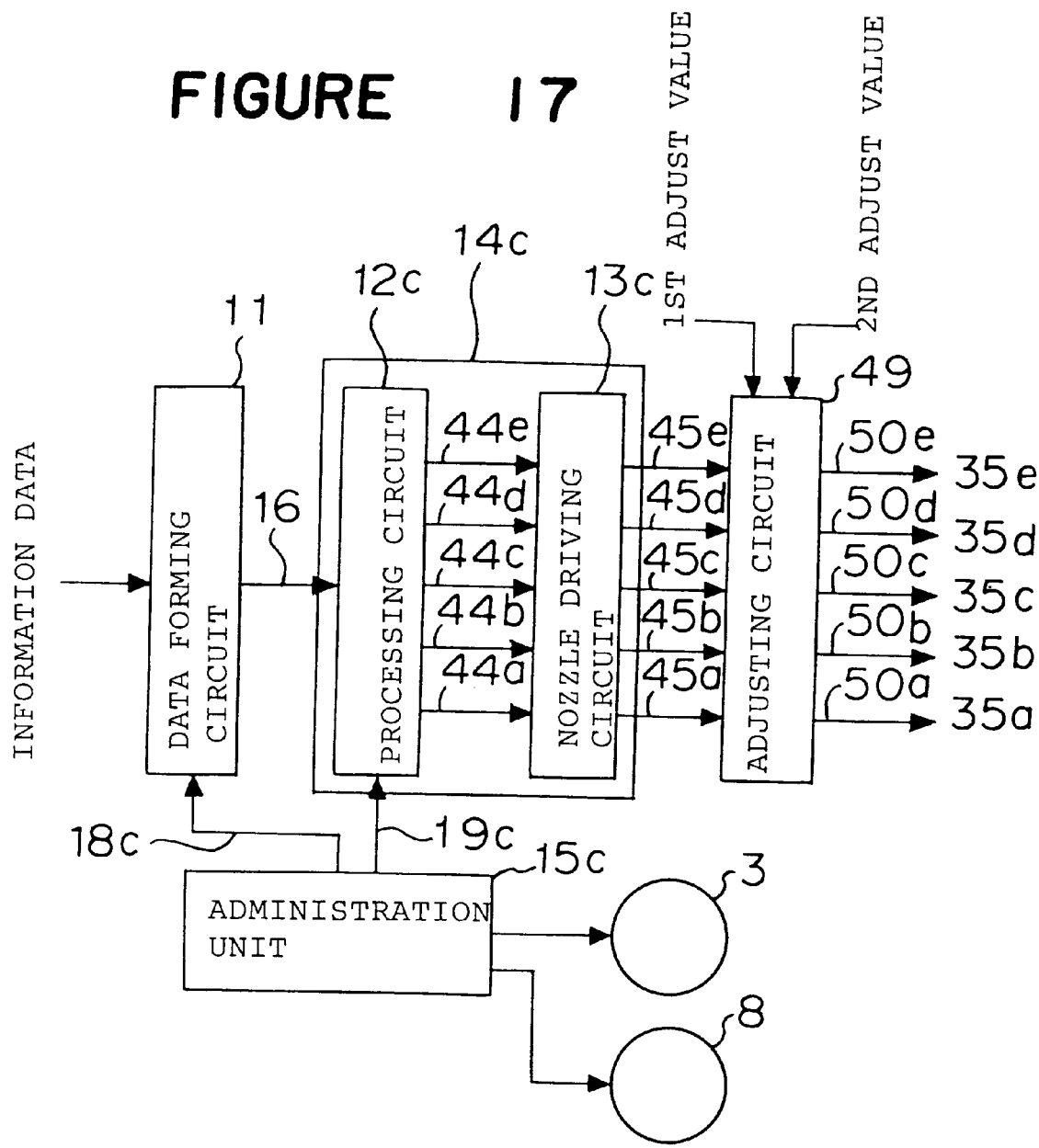

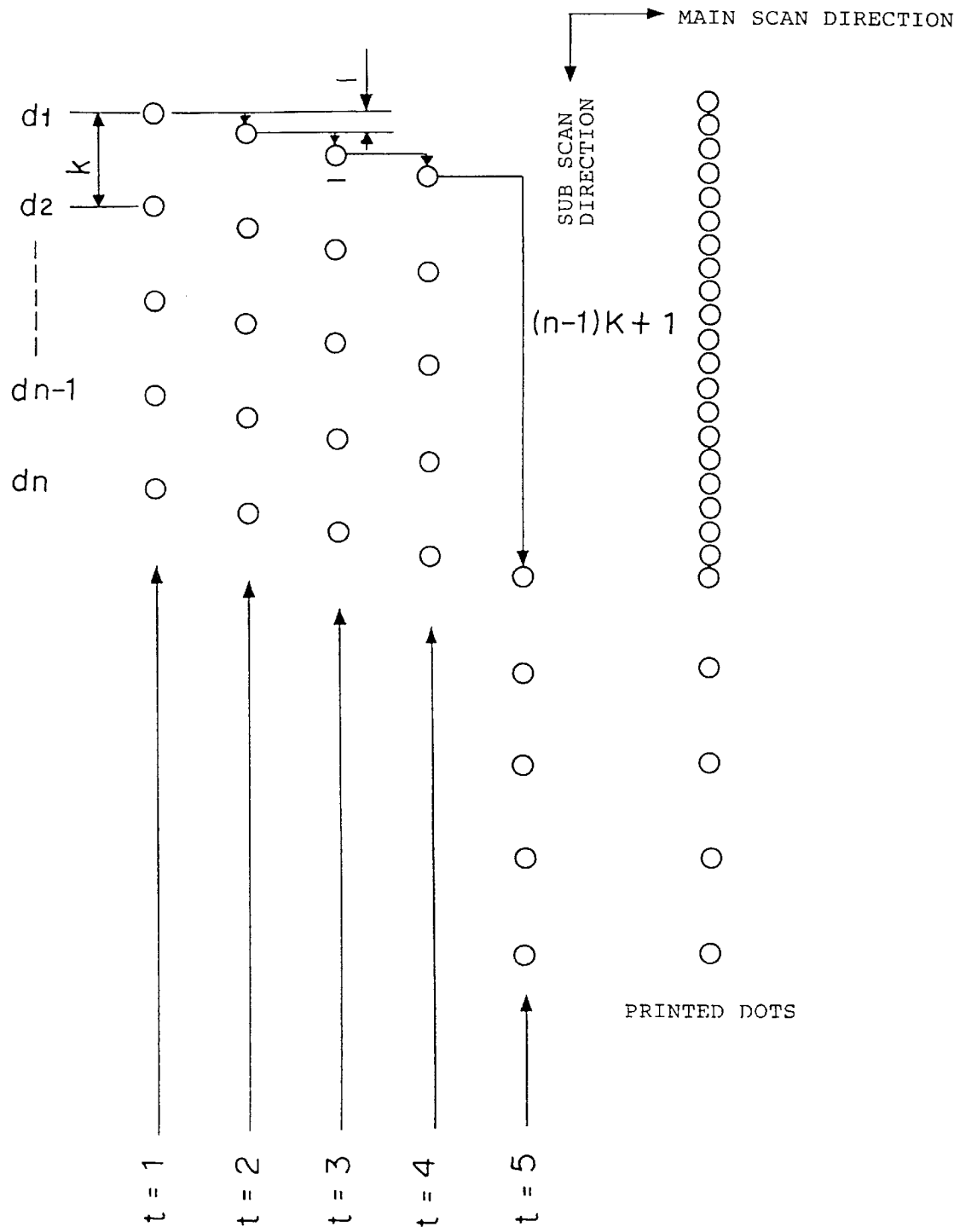

MULTIPLE ELEMENT PRINTER AND METHOD OF ADJUSTING THEREOF

BACKGROUND OF THE INVENTION

1. Field of the Invention

The present invention relates to a multiple element printer which prints by moving a printhead having a plurality of printing elements, a receiving medium in a main scan direction and moving in a sub scan direction, and a method of adjusting a multiple element printer.

Further, the present invention relates to a multiple element printer realizing high print density by controlling an image printing operation of a plurality of printheads which each include a plurality of printing elements.

2. Discussion of Background

According to a print device which operates by relatively moving a printhead and a receiving medium, feed accuracy of the receiving medium and positional accuracy of a plurality of printing elements arranged at the printhead are significant factors affecting quality.

According to such a printhead, although excellent image quality can be obtained by densely arranging the printing elements, the high density formation of the printing elements is actually limited. Hence, the high density formation is realized by arranging a plurality of printing elements at intervals of a printing resolution multiplied by an integer in a direction of feeding a receiving medium (referred to as sub scan direction) and scanning multiple times in a direction of moving the printhead (referred to as main scan direction) and feeding the receiving medium in the sub scan direction by a unit of a minimum resolution. FIG. 19 is an explanatory view illustrating the arrangement of printing elements and the printing operation of a conventional printhead with an example of an interval between the printing elements being k=4 (dots) and a number of the printing elements being n=5. The receiving medium is fed by 1 dot in the sub scan direction at every scanning of the printhead in the main scan direction. In the case of this example, printed dots are formed at an interval of a unit of a minimum resolution, that is, at an interval of 1 dot by 4 times of the main scanning (t=4). When the 4-th main scanning (t=4) has been finished, the receiving medium is fed by $\{(n-1)k+1\}$ dots in the sub scan direction (t=5) and feeding operation of the printhead in the sub scan direction by 1 dot, that is, the operation of the t=1 through t=4 is repeated thereby achieving high density printing.

However, there actually is a very small dispersion in print positions of the respective printing elements in the sub scan direction. The dispersion is caused by a deviation in arrangement of the printing elements per se or is caused by a deviation in forming dots on the receiving medium. The deviation in the print position is significantly manifested at portions of continuous print regions by one printing element coupled with portions of continuous print regions by other printing element whereby the image quality may be deteriorated. Further, in respect of the amount of feed in the sub scan direction, the amount of feed by 1 dot and the amount of feed by $\{(n-1)k+1\}$ dots are mixed. The feed accuracy of the receiving medium is dispersed depending on the amount of feed in the sub scan direction and therefore, when the amounts of feed in the sub scan direction of two kinds or more are mixed, the difference in the accuracy may deteriorate the image quality.

Hence, there has been proposed an interlace printing method to reduce such a dispersion of printing elements and the difference in the feed accuracy. An interlace printing method is described in, for example, U.S. Pat. No. 4,198,642. The interlace printing method is a method where a relationship between an interval k of printing elements and a number thereof is specified and a receiving medium is fed in the sub scan direction by a constant pitch. As conditions of this case, k and n are mutually prime with each other and the feed pitch is set to n by which the interlace printing can be realized. FIG. 20 is an explanatory view for explaining the interlace printing method where the interval between printing elements is set as k=4, the number thereof is set as n=5 and the feed pitch of paper in the sub scan direction is set as n=5. In FIG. 20, notation L designates a print line and the effective interlace printing is conducted at a 4-th main scanning (t=4), that is, a 13-th print line and thereafter.

By adopting the above-described printing method, the printing elements printing contiguous lines are made to differ from each other whereby a disturbance in image quality derived from the positional dispersion of the printing elements is diminished and the deviation in the feed accuracy of a total of a print region is made uniform. However, it is quite difficult to ensure the feed accuracy of the receiving medium and even if the interlace printing is carried out, the image quality may be deteriorated depending on the moving accuracy. FIG. 21 is an explanatory view for explaining problems in the conventional interlace printing method. FIG. 21 shows a case where the interlace printing is carried out using a printhead conducting the operation illustrated by FIG. 20 and is an example where a resolution of a drive source such as a motor or the like is poor; and therefore, the feed accuracy of the receiving medium is low. When an error of $(-\alpha)$ is caused with respect to n dots of the feed amount of a receiving medium, the amount of feed at one time is shortened. Although firstly interlaced print lines of 8 lines are completed at a 4-th main scan (t=4), a gap is actually caused between a 16-th line and a 17-th line which constitutes a streak and deteriorates the image quality. Thereafter, the streaks emerge at every 5 lines. Although the error of the feed amount in the negative direction has been described in the above example, the streaks are also manifested in the case where the error is caused in the positive direction.

The same phenomenon is caused also with respect to the accuracy of attaching the printhead. When the printhead is attached with a certain inclination with respect to the sub scan direction, the actual interval between printing elements in the sub scan direction is contracted in respect of the feed amount of receiving medium. Accordingly, as a result, the phenomenon similar to that where the error of the positive direction is caused in the feed accuracy of the receiving medium, which also appears in images as streaks.

The conventional multiple element printers are constructed as described above and therefore, even if the interlace printing is carried out, when the resolution of the drive source such as a motor or the like is poor and therefore, the feed accuracy of the receiving medium is low, or the attachment accuracy of the printhead is poor, streaks occur in printed images to diminish image quality.

According to the above-described conventional multiple element printers, the high density printing system or the interlace printing system is conducted by adopting the plural time scanning and the feed by a unit of a minimum resolution. Therefore, a very fine deviation in the print position in the sub scan direction of the printing element (that is caused by a dispersion in the characteristic of the printing elements, a deviation in arrangement of the printing elements, a deviation in printing dots on the receiving medium, or the like) or a deviation in feed accuracy of the receiving medium (that is caused by the mixed feed amounts of two kinds or more in the sub scan direction) which is significantly manifested at coupled portions of continuous print regions of the printing elements, deteriorates the image quality. Further, even with the interlace printing system as a measure for such drawbacks, an increase in the number of the printing elements determining the printing speed, which is derived from the high density of the printing elements or an increase in the length of the printhead, increases the dispersion of the characteristic of the printing elements, deteriorates the yield of the printhead per se and increases the cost of the device.

SUMMARY OF THE INVENTION

The present invention resolves the above-described problems. It is a first object of the present invention to provide a multiple element printer capable of obtaining images having stable printing quality and where even if an error occurs in feed accuracy of a receiving medium or in an accuracy of attaching a printhead, printing quality does not deteriorate. It is a second object the present invention to provide a method of adjusting a multiple element printer capable of easily adjusting a multiple element printer for achieving excellent image quality.

According to a first aspect of the present invention, there is provided a multiple element printer comprising:

a printhead arranged with N of printing elements for printing dots on a surface of a receiving medium at intervals of k dots where k and N are positive integers mutually prime with each other, in a direction of moving the receiving medium;

first driving mechanism for driving the receiving medium in the direction of moving the receiving medium;

second driving means for scanning the printhead in a direction of print lines orthogonal to the direction of feeding the receiving medium;

data forming means for outputting previously stored information data for printing the information data onto a surface of the receiving medium;

printing element drive signal forming means for outputting to the printhead printing element drive signals for driving the respective printing elements based on the information data such that a 1st one of the printing elements and an Nth one of the printing elements alternately print the dots at odd ordinal numbers and the dots at even ordinal numbers on substantially the same print lines; and controlling means for controlling the first driving means such that the printing medium is moved by a distance of P dots where N=P+1 at every printing and scanning of the printhead in the direction of the print lines.

According to a second aspect of the present invention, there is provided a multiple element printer according to the first aspect, further comprising:

a printing head for making dot diameters of the 1st one and the Nth one of the printing elements adjustable in accordance with values of the printing elements drive signals; and dot diameter setting means for setting the values of the printing element drive signals.

According to a third aspect of the present invention, there is provided a multiple element printer according to the second aspect, further comprising:

storing means for storing the values of the plurality of printing element drive signals;

inputting means for instructing the values of the printing element drive signals stored in the storing means; and dot diameter setting means for instructing the values of the printing element drive signals in accordance with an instruction of the inputting means.

According to a fourth aspect of the present invention, there is provided a multiple element printer according to the second aspect, further comprising:

storing means for storing the values of the plurality of printing element drive signals; and dot diameter setting means for setting different values of the printing element drive signals stored in the storing means at every time of printing a predetermined number of the print lines when the receiving medium is instructed to print.

According to a fifth aspect of the present invention, there is provided a multiple element printer comprising:

a printhead arranged with N of printing elements for printing dots on a surface of a receiving medium at intervals of k dots where k and N are positive integers mutually prime with each other, in a direction of print lines orthogonal to a direction of feeding the receiving medium;

first driving means for driving the receiving medium in the direction of feeding the receiving medium;

second driving means for scanning the printhead in the direction of the print lines orthogonal to the direction of feeding the receiving medium;

a data forming means for outputting previously stored information data for printing the information data onto a surface of the receiving medium;

printing element drive signal forming means for outputting to the printhead printing element drive signals for driving the respective printing elements based on the information data such that a 1st one and an Nth one of the printing elements alternately print the dots of odd ordinal numbers and the dots of even ordinal numbers on substantially same lines in the direction of feeding the receiving medium; and controlling means for controlling the second driving means such that printhead is moved by P dots where N=P+1, at every feeding operation of the receiving medium in the direction of feeding the receiving medium.

According to a sixth aspect of the present invention, there is provided a multiple element printer according to the first or the fifth aspect, further comprising:

an intermediate transfer medium moving in the direction of feeding the receiving medium by a distance of P dots at every time of scanning a printhead;

the printhead arranged with printing elements for printing dots on a surface of the intermediate transfer medium in place of the surface of the receiving medium; and transfer means for transferring the dots printed on the surface of the intermediate transfer medium onto the receiving medium by pressing the surface of the intermediate transfer medium to the receiving medium.

According to a seventh aspect of the present invention, there is provided a multiple element printer comprising:

a printhead arranged with N of printing elements for printing dots on a surface of a receiving medium at intervals of k dots where k and N are positive integers prime with each other, in a direction of feeding the receiving medium;

first driving means for driving the receiving medium in the direction of feeding the receiving medium;

second driving means for scanning the printhead in a direction of print lines orthogonal to the direction of feeding the receiving medium;

data forming means for outputting previously stored information data for printing the information data on the surface of the receiving medium;

printing element drive signal forming means for outputting printing element drive signals for driving the respective printing elements to the printhead based on the information data;

dot diameter adjusting means for adjusting sizes of dot diameters printed by a 1st one and an Nth one of the printing elements; and controlling means for controlling the first driving means such that the receiving medium is moved by a distance of N dots at every printing and scanning of the printhead in the direction of the print lines.

According to an eighth aspect of the present invention, there is provided a multiple element printer according to the seventh aspect, wherein the dot diameter adjusting means adjusts the sizes of the dot diameters printed by the 1st one and the, Nth one of the printing elements as well as sizes of dot diameters printed by a 2nd one and a (N−1)th one of the printing elements.

According to a ninth aspect of the present invention, there is provided a method of adjusting a multiple element printer for print information by scanning in a direction of print lines a printhead arranged with N of printing elements for printing dots on a surface of a receiving medium at intervals of k dots where k and N are positive integers mutually prime with each other, in a direction of feeding the receiving medium by moving the receiving medium by a distance of P dots where N=P+1 at every printing and scanning of the printhead in the direction of the print lines orthogonal to the direction of feeding the printhead, said method comprising:

a printing step of printing a predetermined number of lines by the respective printing elements such that a 1st one and an Nth one of the printing elements alternately print the dots of odd ordinal numbers and the dots of even ordinal numbers substantially on same print lines; and an adjusting step of adjusting dot sizes of the 1st one and the Nth one of the printing elements.

According to a tenth aspect of the present invention, there is provided a method of adjusting a multiple element printer for printing information by scanning in a direction of print lines a printhead arranged with N of printing elements for printing dots on a surface of a receiving medium at intervals of k dots where k and N are positive integers mutually prime with each other, in a direction of feeding the receiving medium by moving the receiving medium by a distance of N dots at every printing and scanning of the printhead in the direction of the print lines orthogonal to the direction of feeding the printhead, said method comprising:

a printing step of printing a predetermined number of the lines by the respective printing elements; and an adjusting step of adjusting dot sizes of a 1st one and an Nth one of the printing elements.

According to an eleventh aspect of the present invention, there is provided a multiple element printer comprising:

first and second driving means for feeding a receiving medium in a direction of moving the receiving medium (in a sub scan direction) and moving a printhead in a direction of print lines orthogonal to the direction of feeding the receiving medium (in a main scan direction);

printheads of a number m formed by dividing k by an integer equal to or larger than 2, each including printing elements of a number n arranged in the sub scan direction at intervals of k dots where k and n are integers mutually prime with each other and where an Nth one of the printing elements of a first one of the printheads and a 1st one of the printing elements of a second one of the printheads contiguous to the first one of the printheads are arranged in the sub scan direction by an interval of D dots where D and k are integers mutually prime with each other; and controlling means for outputting printing element drive signals formed based on inputted information data to the printheads by transferring the receiving medium by a feed amount of P dots where P is n×m by the first driving means driving the receiving medium when one image printing operation has been finished by the printheads moved by the second driving means driving the printheads in the main scan direction.

According to a twelfth aspect of the present invention, there is provided a multiple element printer comprising:

first and second driving means for feeding a receiving medium in a direction of moving the receiving medium (in a sub scan direction) and moving a printhead in a direction of print lines orthogonal to the direction of feeding the receiving medium (in a main scan direction);

printheads of a number m formed by dividing k by an integer equal to or larger than 2, each including printing elements of a number n arranged in the main scan direction at intervals of k dots where k and n are integers mutually prime with each other and where an Nth one of the printing elements of a first one of the printheads and a 1st one of the printing elements of a second one of the printheads contiguous to the first one of the printheads are arranged in the main scan direction at an interval of D dots where D and k are integers mutually prime with each other; and controlling means for outputting printing element drive signals formed based on inputted information data to the printheads at every distance corresponding to an amount of moving the printheads by P dots where P is n×m in moving the printheads in the main scan direction by the second driving means.

According to a thirteenth aspect of the present invention, there is provided a multiple element printer according to the eleventh or the twelfth aspect, wherein the first driving means uses a drum capable of mounting the receiving medium and rotated with an axis as a center.

According to a fourteenth aspect of the present invention, there is provided a multiple element printer comprising:

first and second driving means for feeding a receiving medium in a direction of feeding the receiving medium (in a sub scan direction) and moving a printhead in a direction of print lines orthogonal to the direction of feeding the receiving medium (in a main scan direction);

printheads of a number m formed by dividing k by an integer equal to or larger than 2, each including printing elements of a number n arranged in the sub scan direction at intervals of k dots where k and n are integers mutually prime with each other and where an Nth one of the printing elements of a first one of the printheads and a 1st one of the printing elements of a second one of the printheads contiguous to the first one of the printheads are arranged in the sub scan direction by an interval of D dots where D and k are integers mutually prime with each other where the dots are printed on a surface of an intermediate transfer medium for moving the receiving medium in the direction of feeding the receiving medium in place of the surface of the receiving medium;

transfer means for transfer the dots printed on the surface of the intermediate transfer medium to the receiving medium by pressing the surface thereof;

controlling means for outputting print element drive signals formed based on inputted information data to the printheads by feeding the receiving medium between the first driving means and the transfer means by the first driving means in synchronism with a speed and a feed amount equal to a peripheral speed and an angle of the intermediate transfer medium rotated by the angle corresponding to a constant peripheral distance of P dots where P is n×m when one image printing operation by the printheads moving in the main scan direction by the second driving means has been finished.

BRIEF DESCRIPTION OF THE DRAWINGS

FIG. 10 is a constitutional view showing a printhead according to Embodiment 5 of the present invention;

FIG. 17 is a constitutional view showing a multiple element printer according to Embodiment 8 of the present invention;

FIG. 19 is an explanatory view for explaining printing operation of a conventional multiple element printer which is fed by a very small amount;

DETAILED DESCRIPTION OF PREFERRED EMBODIMENTS

Embodiment 1

An explanation will be given of a multiple element printer according to Embodiment 1 of the present invention in reference to drawings as follows.

Figure 1:
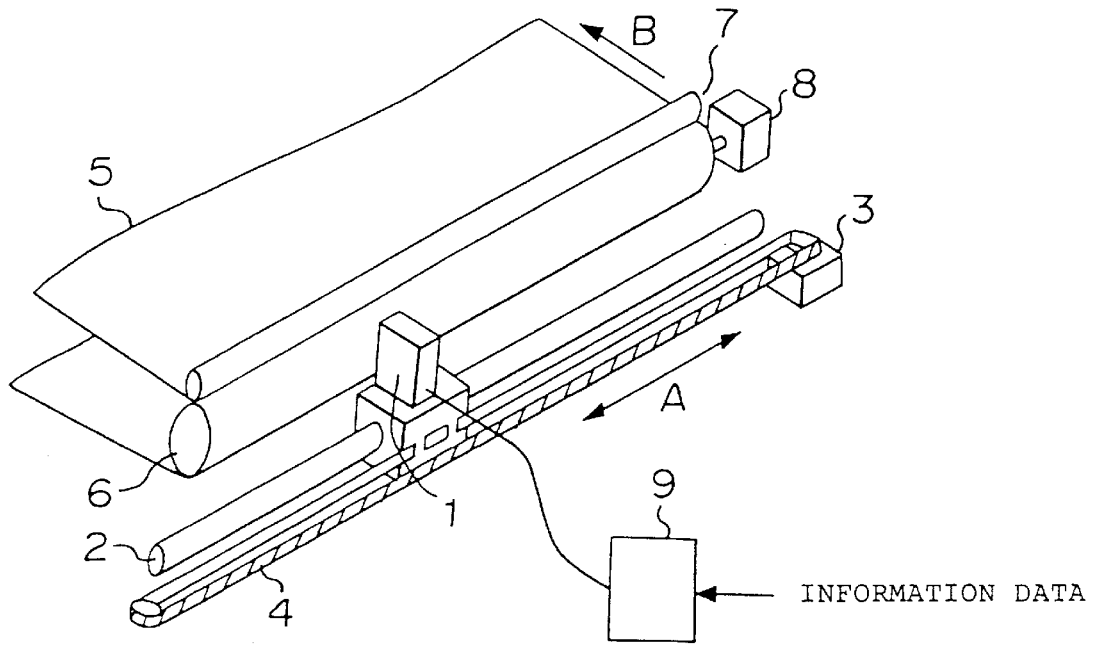
FIG. 1 is a constitutional view showing a multiple element printer according to Embodiment 1 of the present invention.

FIG. 1 is a constitutional view showing a multiple element printer according to Embodiment 1. In FIG. 1, numeral 1 designates an ink jet head (hereinafter printhead) arranged with a group of printing elements where a plurality of nozzles ejecting ink are installed as the printing elements, numeral 2 designates a shaft for supporting the printhead 1 and guiding the printhead 1 in an arrow mark A direction (hereinafter, referred to as main scan direction) when the printhead is moved, numeral 3 designates a scan motor as a second driving means for moving the printhead 1, numeral 4 designates a drive belt for transmitting the drive force of the scan motor 3 to the printhead 1, numerals 6 and 7 are rollers for supporting a receiving medium 5 and feeding the receiving medium 5 in an arrow mark B direction (hereinafter, referred to as sub scan direction), numeral 8 designates a feed motor as a first driving means for driving the roller 6 for driving the receiving medium 5 and numeral 9 designates a control unit for driving the printhead 1 based on information data expressing image or letter information and controlling the scan motor 3 and the feed motor 8.

Next, an explanation will be given of the operation in reference to the drawings. N nozzles as the printing elements for ejecting ink to the receiving medium 5 are arranged at the printhead 1 along the sub scan direction. Any method of ejecting ink may be used; for example, ejecting ink by generating a pressure by using an electricity-mechanical converting element such as a piezoelectric element, an electricity-heat converting element where the pressure is applied on ink by heated steam or the like, and so on are available. The control unit 9 generates drive signals for actually driving the respective nozzles in the printhead 1 based on information data representing image or letter information and output the drive signals to the printhead 1 by which ink is made to eject onto the receiving medium 5 so that a printing image is formed. In this case, the scan motor 3 and the printhead 1 are connected by the drive belt 4 and when the control unit 9 drives the scan motor 3, the printhead 1 is moved in the main scan direction while ejecting ink and being guided by the shaft 2 such that one operation of image printing is conducted. When the one image printing operation has been finished, the control unit 9 successively drives the feed motor 8, moves the receiving medium 5 in the sub scan direction by a constant distance (P dots) and returns the printhead 1 to the initial position. Further, the control unit 9 makes the printhead 1 eject ink while moving it so that a second operation of image printing is carried out. Thereafter, the operation of feeding the receiving medium by the constant distance (P dots) after finishing one operation of image printing, is repeated until all the information data is printed.

Figure 2:
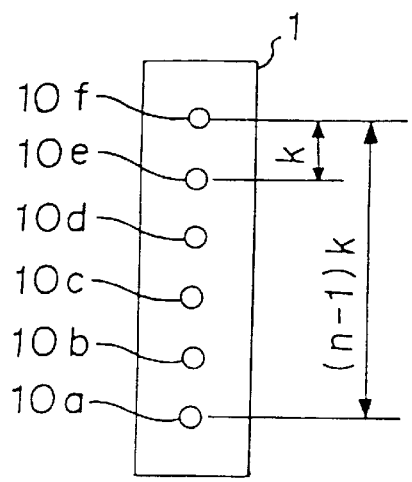
FIG. 2 is a constitutional view showing a printhead according to Embodiment 1 of the present invention.

FIG. 2 is a constitutional view showing the printhead of the present invention where an arrangement of nozzles is shown. In FIG. 2, notations 10*a* through 10*f* designate respective nozzles. Defining an interval between contiguous nozzles as k (dots) and a number of nozzles as N, the following relationships are satisfied among k, N and the amount of feed P in one feeding operation of the above-described receiving medium 5.

(1) k and N are positive integers mutually prime with each other.

(2) N=P+1

An explanation will be given of Embodiment 1 with respect to the case of k=4 (dots), P=5 (dots) and N=6 as an example.

Figure 3:
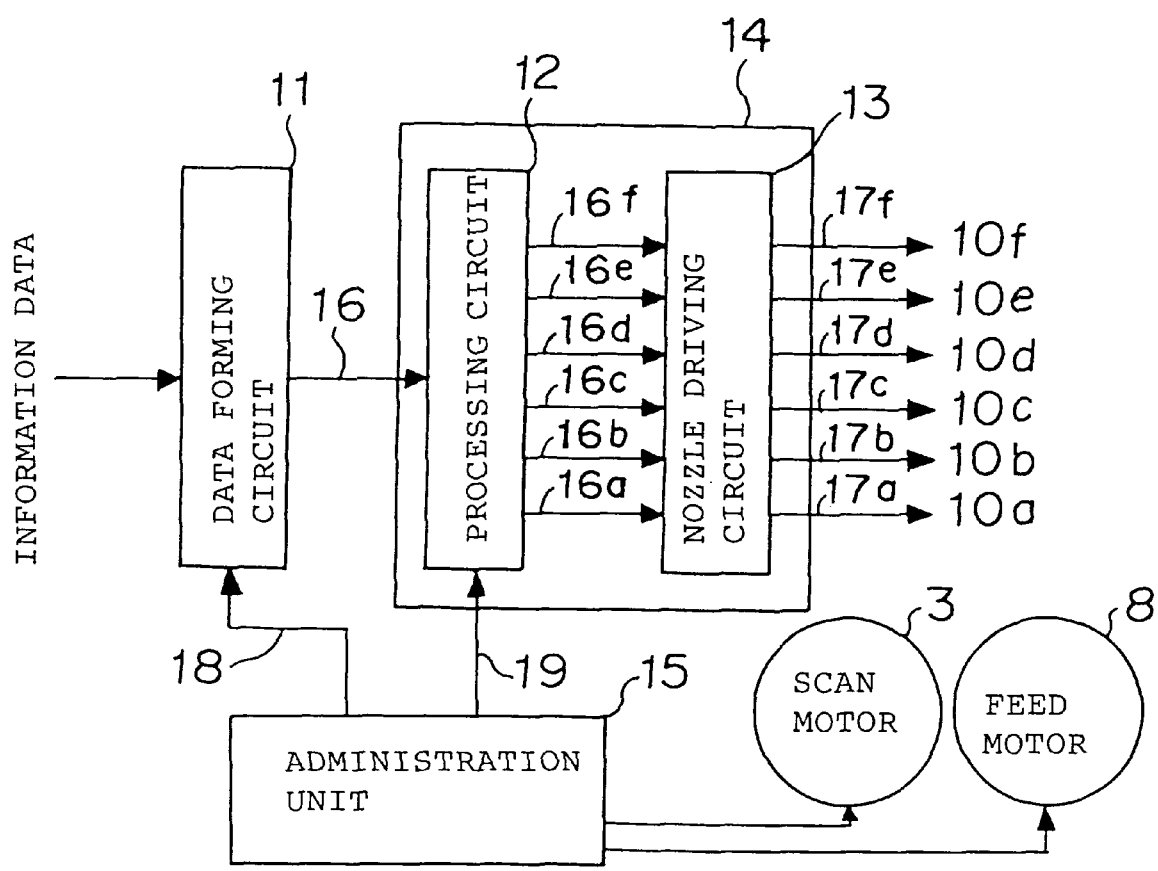
FIG. 3 is a constitutional view showing a control unit according to Embodiment 1 of the present invention.

Next, an explanation will be given of the constitution of the control unit 9 in reference to the drawings. FIG. 3 is a constitutional diagram showing the control unit 9 shown by FIG. 1. In FIG. 3, numeral 11 designates a data forming circuit having a storing means for storing information data representing image or letter information. Numeral 12 designates a processing circuit as a processing means for selecting and reading as data 16 the information data in accordance with the arrangement of the nozzles in the printhead 1 from the data forming circuit 11 and outputting printing data 16*a* through 16*f* in accordance with the respectives of the nozzles 10*a* through 10*f*, numeral 13 designates a nozzle driving circuit as a signal generating means for generating drive signals 17*a* through 17*f* for actually driving the nozzles 10*a* through 10*f* based on the printing data 16*a* through 16*f*. Numeral 14 designates a printing element drive signal forming means comprising the processing circuit 12 and the nozzle driving circuit 13. Numeral 15 designates an administration unit as a controlling means for controlling the scan motor 3 and the feed motor 8 and starting up the data forming circuit 11 and the processing circuit 12, numeral 18 designates a start signal for starting up the data forming circuit 11 and numeral 19 designates an instruction signal for instructing to which nozzles ink is to be ejected.

Next, an explanation will be given of the operation of the control unit 9 in reference to the drawings. When the information data is inputted, the information data is stored in the data forming circuit 11. When the administration unit 15 outputs the start signal 18 to the data forming circuit 11, the data forming circuit 11 successively reads the information data in correspondence with 1 line of pixels which are to be printed by the respectives of the nozzles 10*a* through 10*f* at the printhead 1 and outputs the information data to the processing circuit 12 as the data 16*a* through 16*f*. When the data 16*a* through 16*f* is inputted to the processing circuit 12, the data 16*a* through 16*f* is distributed in respect to the respective nozzles and when the instruction signal 19 is inputted from the administration unit 15, the printing data 16*a* through 16*f* is outputted to the nozzle driving circuit 13. The printing data 16*a* through 16*f* is data only representing whether ink is to be ejected or not and when ink is to be ejected, "1" is outputted and when ink is not to be ejected, "0" is outputted. Here, the instruction signal 19 is a signal of 6 bits where the lowest bit corresponds to the nozzle 10*a* and the highest bit corresponds to the nozzle 10*f*. The printing data in correspondence with the data 10*a* through 10*f* are outputted to the nozzles where "1" is described in the instruction signal 19 and the printing data prohibiting to eject ink are outputted to the nozzles where "0" is described in the instruction signal 19, with respect to all the data of 1 line. Further, the printing data 16*a* in correspondence with the nozzle 10*a* always outputs "0" to pixels of even ordinal numbers and the printing data 16*f* in correspondence with the nozzle 10*f* always outputs "0" to pixels of odd ordinal numbers. When the printing data 16*a* through 16*f* is inputted to the nozzle driving circuit 13, the nozzle driving circuit 13 generates the drive signals 17*a* through 17*f* for actually driving the respective nozzles in accordance with values of the data and outputs them to the nozzles 10*a* through 10*f*.

The administration unit 15 outputs the start signal 18 to the data forming circuit 11, successively operates the scan motor 3 and moves the printhead 1 in the main scan direction. The administration unit 15 detects the amount of movement of the printhead 1 in the main scan direction by monitoring a rotational angle of the scan motor 3 and when the printhead 1 is moved to a position on the receiving medium 5 where a dot is initially formed, the administration unit 15 outputs the start signal 19 to the processing circuit 12 such that the printing data 16*a* through 16*f* is outputted to the nozzle driving circuit 13. The nozzle driving circuit 13 generates the drive signals 17*a* through 17*f* for actually driving the nozzles 10*a* through 10*f* in accordance with the printing data outputted from the processing circuit 12 and outputs them to the printhead 1 by which the respective nozzles carries out the one operation of printing 1 line.

Next, the administration unit 15 drives the feed motor 8, moves the receiving medium 5 in the sub scan direction by 5 lines, returns the printhead 1 to the initial position and repeats the above-described printing operation.

Figure 4:
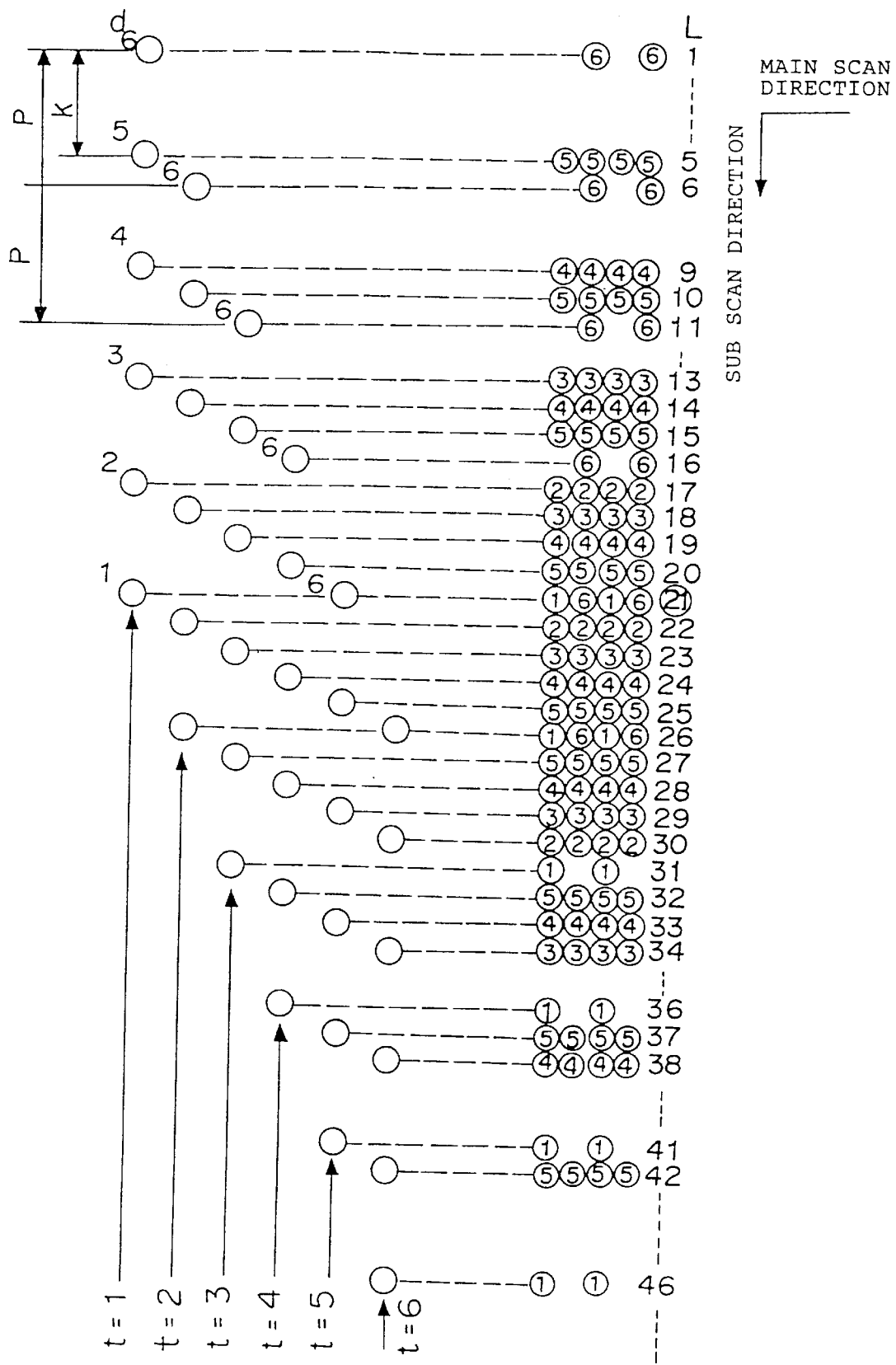
FIG. 4 is a diagram for explaining printing operation of the multiple element printer according to Embodiment 1 of the present invention.

FIG. 4 is an explanatory view for explaining printing operation of the multiple element printer according to Embodiment 1. According to FIG. 4, N=6 in respect of the number of the nozzles, notation d represents printed dots printed by the respective nozzles and notation t designates a number of scan. k=4 (dots) in respect of the interval between the contiguous nozzles and P=5 in respect of the feed pitch of the receiving medium in the sub scan direction. With respect to the sub scan direction, a printed dot contiguous to another printed pixel, is printed by a nozzle that is always different from a nozzle for printing the other printed pixel by which a print result similar to that in the interlace printing is provided. Here, although the first nozzle and the sixth nozzle print the same line, as mentioned above, the first nozzle does not print dots at even ordinal numbers and the sixth nozzle does not print dots at odd numeral numbers and therefore, the first nozzle and the sixth nozzle alternately print these pixels as indicated by print lines L=21, 26 in FIG. 4. Also, the effective area as a print region actually comprises lines at L=17 and thereafter and accordingly, the image printing is carried out at only the effective print region by controlling the printing data of the respective nozzles by the instruction signal 19 such that the dots are not printed in respect of the print lines prior to L=17.

Figure 5:
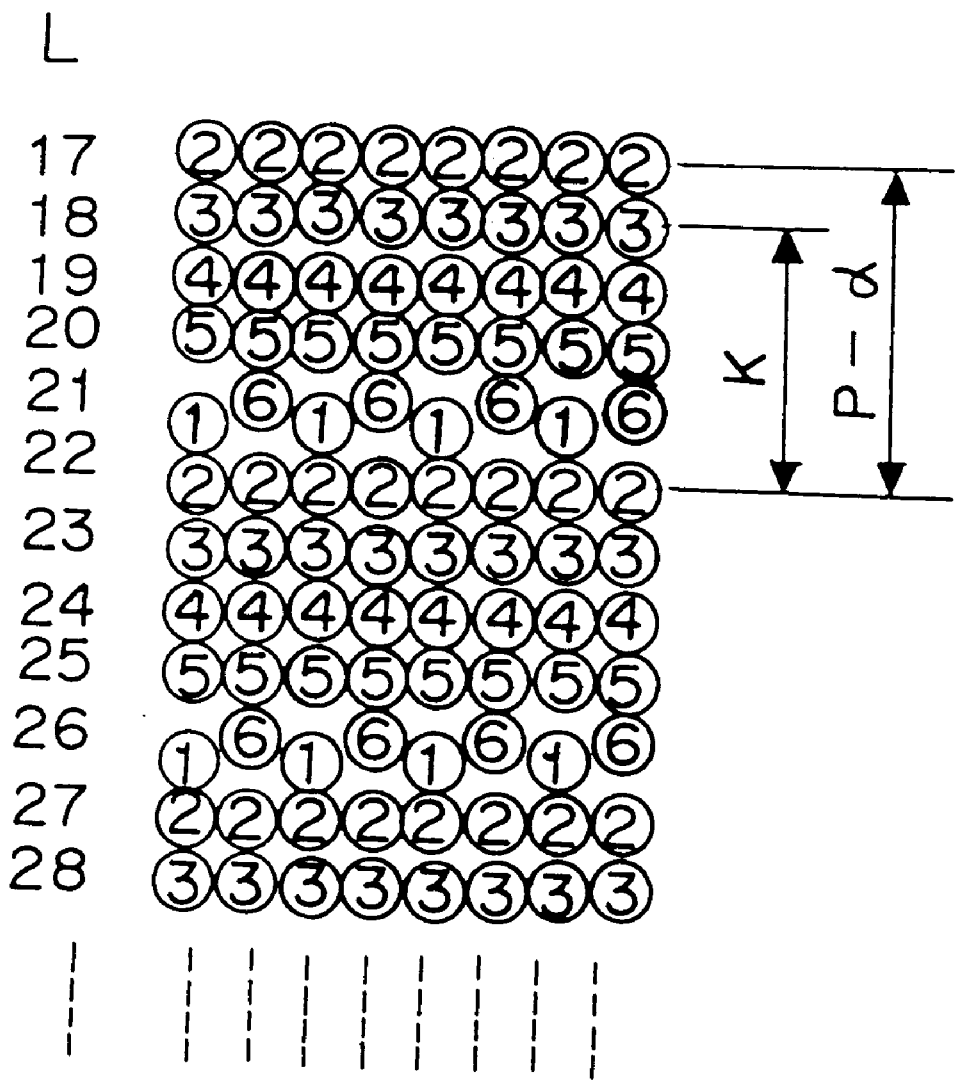
FIG. 5 is an explanatory view for explaining an operation of preventing streaks of the multiple element printer from occurring according to Embodiment 1 of the present invention.

FIG. 5 is an explanatory view for explaining the operation of preventing occurrence of streaks by the multiple element printer according to Embodiment 1 where a print result when an error is caused in the amount of feeding the receiving medium 5 in the sub scan direction, is shown. In the case where the actual amount of feed is smaller than the regular amount of feed P by α, considerable occurrence of streaks is observed between the print lines L=20 and L=21 according to the conventional interlace printing, however, according to the present invention, the first nozzle and sixth nozzle alternately print dots at the print line of L=21 and therefore, there causes no gap between the lines whereby occurrence of conspicuous streaks can be prevented. Also, similar reasoning is applicable also in the case where the actual amount of feed is larger than the feed amount P of the receiving medium 5 whereby the occurrence of streaks can also be prevented.

The occurrence of streaks is prevented even in the case where an error is caused in the feed accuracy of the receiving medium 5 or in the accuracy of installing the printhead 1 by constituting the multiple element printer as described above and adverse influence thereof is not manifested in the printed image by which images having stable image quality are obtained.

Incidentally, although the printhead in the case of k=4 (dots), P=5 (dots) and N=6 is shown in Embodiment 1 as an example, any values may be selected for k, N and P so far as the above-described relationships are satisfied. Also, the constitution of the multiple element printer is naturally adaptable to color printing. Furthermore, although an explanation has been given of Embodiment 1 with an example of the ink jet head for ejecting ink that is constituted by the group of printing elements, a thermal head may be used and any system of a group of printing elements may be used so far as they can form dots on the receiving medium 5.

Embodiment 2

Figure 6:
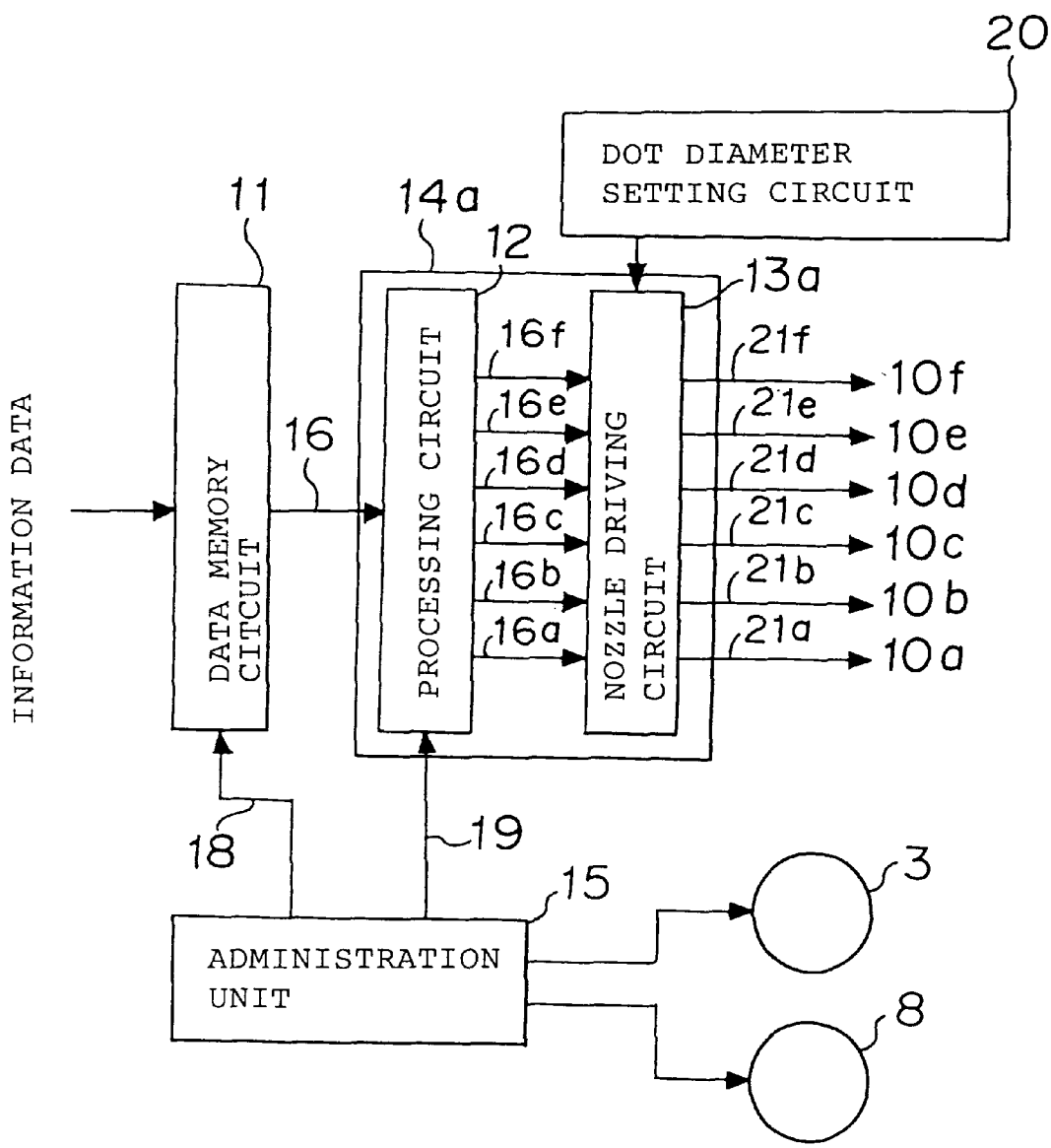
FIG. 6 is a constitutional view showing a control unit according to Embodiment 2 of the present invention.

An explanation will be given of a multiple element printer according to Embodiment 2 of the present invention in reference to the drawings. FIG. 6 is a constitutional diagram showing a controlling unit of a multiple element printer according to Embodiment 2 of the present invention where notations the same as those in FIG. 3 represent the same or the corresponding portions and an explanation thereof will be omitted. In FIG. 6, notation 13a designates a nozzle driving circuit where in generating drive signals 21a through 21f for actually driving the nozzles 10a through 10f based on the printing data 16a through 16f, voltage values of the drive signals 21a through 21f are changed in accordance with inputted set values and thereafter, the voltage values are outputted and notation 14a designates a printing element drive signal forming means comprising the processing circuit 12 and the nozzle driving circuit 13a and numeral 20 designates a dot diameter setting circuit for outputting set values for changing the voltage values of the drive signal 21a and 21f outputted by the nozzle driving circuit 13a.

Next, an explanation will be given of the operation in reference to the drawings. A series of operations from inputting the information data to the data forming circuit 11 to outputting the printing data 16a through 16f from the processing circuit 12 to the nozzle driving circuit 13a are the same as those in Embodiment 1. When the printing data 16a through 16f is inputted to the nozzle driving circuit 13a, the driving signals 21a through 21f for actually driving the respective nozzles in accordance with the data values are generated and outputted to the nozzles 10a through 10f. At this moment, the nozzle driving circuit 13a receives the set values in accordance with, for example, values of variable resistors installed to the dot diameter setting circuit 20 and voltage values of the drive signal 21a of the nozzle 10a and the drive signal 21f of the nozzle 10f are made different from the other drive signals 21b through 21e based on the given set values and outputted. When the drive signals 21a through 21f outputted from the nozzle driving circuit 13a are outputted to the printhead, the nozzle 10a through 10f eject ink in accordance with the voltage values of the drive signals in correspondence with the respective nozzles by which dots are printed on the receiving medium 5. In this case, when the voltage values of the drive signal 21a and 21f are different from the voltage values of the other drive signals, the nozzles 10a and 10f print dots with sizes of diameters of the printed dots different from sizes of diameters of dots printed by the other nozzles. The other operations are the same as those in Embodiment 1.

Figure 7:
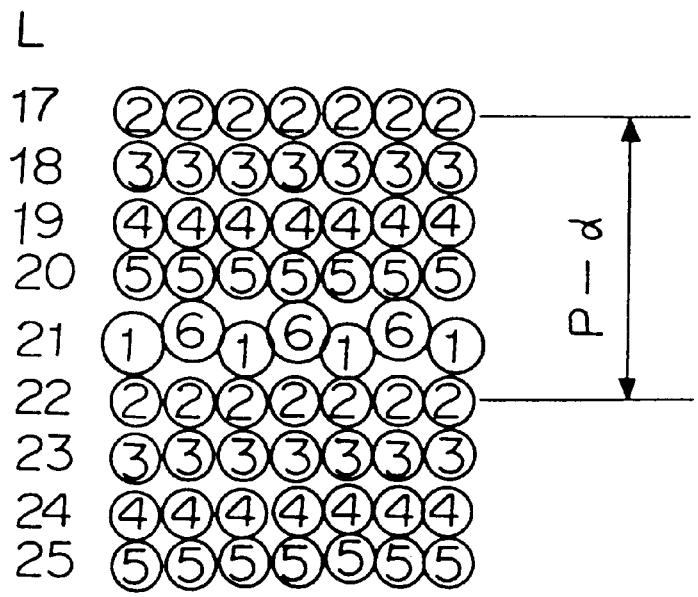
FIGS. 7(a) and 7(b) are views for explaining printing operation of a multiple element printer according to Embodiment 2 of the present invention.
Figure 7:
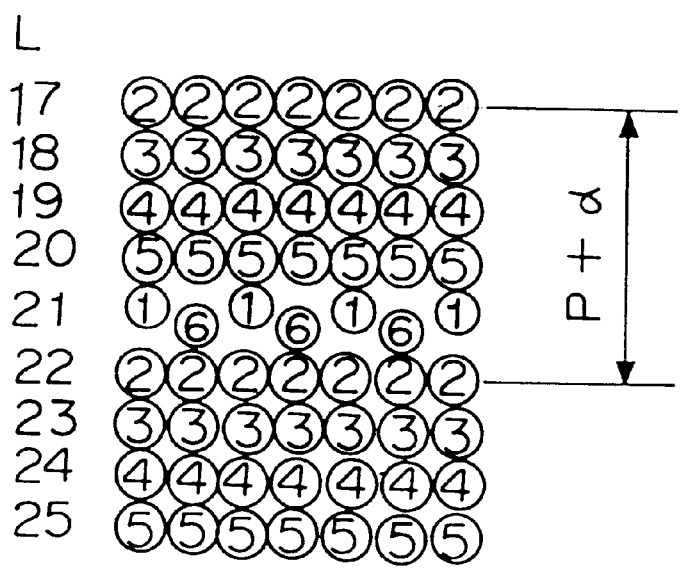

Next, an explanation will be given of an adjusting operation in the case where the dot diameters are changed. FIGS. 7(a) and 7(b) are explanatory views for explaining printing operation of the multiple element printer according to Embodiment 2 of the present invention in which a result of the case where the printing operation is carried out by changing the dot diameters when an error is caused in the amount of feeding the receiving medium. FIG. 7(a) shows the case where the actual amount of feed is shorter than the regular amount of feed P by α. In this case, the interval between the print lines L=20 and L=22 is widened and therefore, the occurrence of streaks is more effectively prevented by enlarging the sizes of the dot diameters alternately printed by the nozzle 10a and the nozzle 10f compared with the sizes of the dot diameters printed by the other nozzles. Further, FIG. 7(b) shows the case where the actual amount of feed is longer than the regular amount of feed P by α. In this case, the interval between the print lines L=20 and L=22 is conversely narrowed and therefore, the occurrence of streaks can more effectively be prevented by making the sizes of the dot diameters printed alternately by the nozzles 10a and 10f smaller than the sizes of the dot diameter printed by the other nozzles. In actually adjusting the sizes of the dot diameters, the set values are changed by printing information data for adjusting image quality and adjustment of the sizes of the dot diameters is finished when the occurrence of streaks is dispensed with.

By constituting the multiple element printer as described above, the occurrence of streaks due to an error in feeding the receiving medium 5 in the sub scan direction of the multiple element printer can be prevented by which printed images having high quality can be obtained.

Embodiment 3

Figure 8:
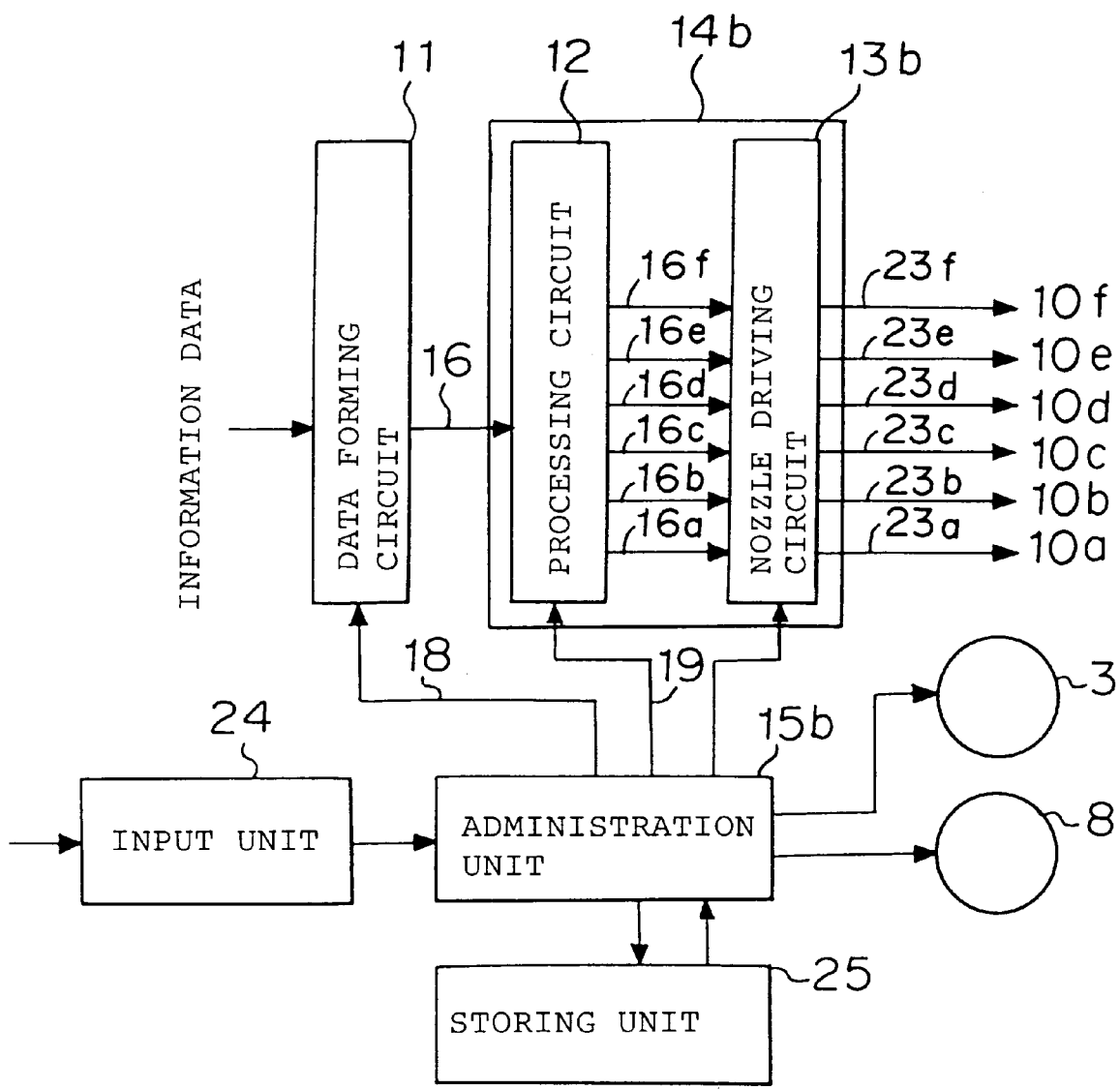
FIG. 8 is a constitutional view showing a control unit according to Embodiment 3 of the present invention.

An explanation will be given of a multiple element printer according to Embodiment 3 of the present invention in reference to the drawings. FIG. 8 is a constitutional diagram showing another control unit in the multiple element printer according to Embodiment 3 of the present invention where notations the same as those in FIG. 3 designate the same or the corresponding portions and an explanation thereof will be omitted. In FIG. 8, notation 13b designates a nozzle driving circuit in which in generating drive signals 23a through 23f for actually driving the nozzles 10a through 10f based on the printing data 16a through 16f, voltage values of the drive signals 23a and 23f are changed in accordance with inputted set values and outputted, notation 14b designates a printing element drive signal forming means comprising the processing circuit 12 and the nozzle driving circuit 13b, numeral 24 designates an input unit for instructing sizes of dot diameters, numeral 25 designates a storing unit storing a plurality of the set values and the other constitutions are the same those in Embodiment 2.

Next, an explanation will be given of the operation in reference to the drawing. A series of operations from inputting the information data to the data forming circuit 11 to outputting the printing data 16a through 16f from the processing circuit 12 to the nozzle driving circuit 13b are the same as those in Embodiment 1. When the printing data 16a through 16f is inputted to the nozzle driving circuit 13b, the drive signals 23a through 23f for actually driving the respective nozzles in accordance with data values are generated and outputted to the nozzles 10a through 10f. At this moment, set values are inputted from the administration unit 15 to the nozzle driving circuit 13b and voltage values of the drive signal 23a of the nozzle 10a and the drive signal 23f of the nozzle 10f are changed from those of the other drive signals 23b through 23f based on the given set values and outputted. When the drive signals 23a through 23f outputted from the nozzle driving circuit 13b are inputted to the printhead, the nozzles 10a through 10f eject ink in accordance with the voltage values of the drive signals in correspondence with the respective nozzles whereby dots are printed on the receiving medium. In this case, when the voltage values of drive signals 23a and 23f are different from the voltage values of other drive signals, dots are printed with the sizes of the dot diameters printed by the nozzles 10a and 10f different from the sizes of the dot diameters recorded by the other nozzles.

The input unit 24 may have a simple constitution capable of inputting numerical values from outside such as that of a dip switch and numerical values instructing desired sizes of dot diameters are set in the input unit 24. Here, when a numerical value "0" is instructed, it signifies that the outputting operation is conducted without changing the sizes of the dot diameters. In the printing operation, the administration unit 15 initially reads the information of the input unit 24. The storing unit 25 is consisted by an involatile memory where a plurality of set values for changing the sizes of the dot diameters are stored. The administration unit 15 reads the plurality of set values from the storing unit 25 based on the values of the input unit 24 and set the values to the nozzle driving circuit 13b. The other operations are the same as those in Embodiment 2.

The occurrence of streaks due to an error in feeding the receiving medium 5 in the sub scan direction can be restrained in the multiple element printer by constituting the multiple element printer as described above by which printed images having high quality may be achieved and the adjusting operation for preventing the occurrence of streaks can simply be executed.

Embodiment 4

Figure 9:
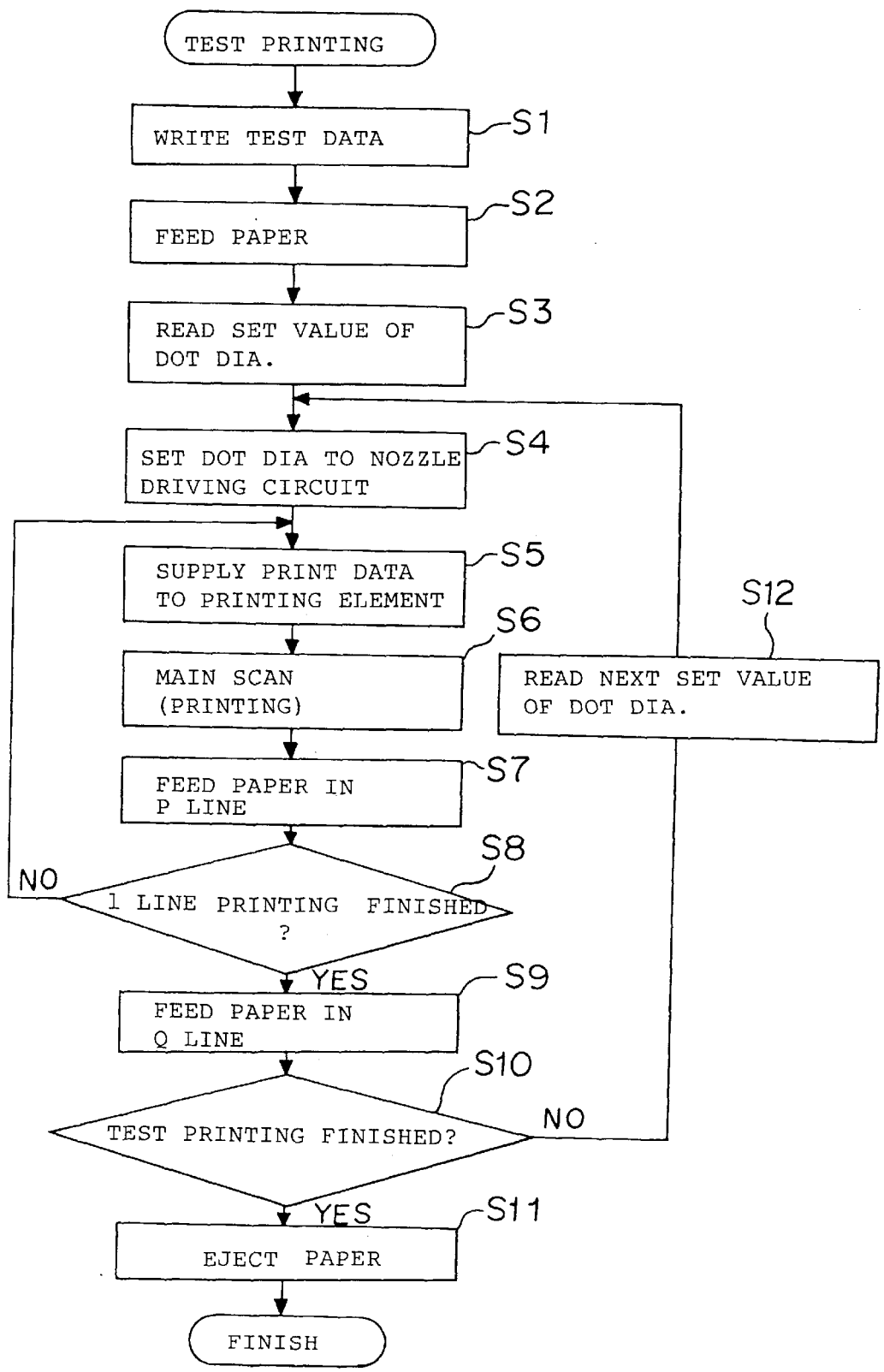
FIG. 9 is a flowchart showing processing steps of test printing according to Embodiment 4 of the present invention.

An explanation will be given of a method of adjusting a multiple element printer according to Embodiment 4 of the present invention in reference to the drawings. FIG. 9 is a flowchart showing a method of adjusting a multiple element printer according to Embodiment 4 of the present invention where contents of respective steps are described in steps S1 through S12. The constitution of the multiple element printer and the constitution of the control unit in Embodiment 4 are the same as those in Embodiment 3.

Next, an explanation will be given of the operation of adjusting a multiple element printer in test printing in reference to the drawings. Receiving instruction of test printing from an operation panel, not illustrated, image data for test printing is written to the data forming circuit 11 as test data (step S1) and the receiving medium is fed (step S2). Next, set values of initial sizes of dot diameters are read from the storing unit 25 (step S3) and are set to the nozzle driving circuit (step S4).

Next, an operation of printing the test data on the receiving medium 5 is conducted in steps of S5 through S8. The operation of the image printing is the same as that in Embodiment 3. When it is determined that printing of a predetermined number of lines has been finished in step S8, the receiving medium 5 is fed by a constant amount for printing successive test data (step S9). Next, whether the test printing has been finished is determined in step S10. There are a plurality of the set values in respect of the sizes of the dot diameters and therefore, in the determination of finishing the test printing, whether the printing operation by using all of the set values has been finished is determined and if there are set values of which the printing has not been executed, the next set value is read from the storing unit 25 (step S12) and the steps of S4 through S8 from setting the values to the nozzle driving circuit 13b to finishing the printing of the predetermined number of lines, are repeated again. When it is determined in step S10 that the printing operation using all of the set values has been finished, the receiving medium 5 is discharged (step S11) whereby the test printing is finished.

When the multiple element printer is adjusted by the above-described method, a plurality of test print samples where the dot diameters are changed can be obtained on one sheet of the receiving medium 5 in one operation. Further, the set values in respect of the sizes of the dot diameters are set in the order of numerical values instructed to the input unit 24. Accordingly, when the number of the sample having the best image quality among the plurality of obtained test printing samples, is instructed to the input unit 24, excellent printing is always carried out in the actual image printing, the operation of adjusting print quality can efficiently be performed and images having excellent print quality can simply be provided.

Embodiment 5

An explanation will be given of a multiple element printer according to Embodiment 5 of the present invention in reference to the drawings. FIG. 10 is a constitutional diagram showing a printhead of a multiple element printer according to Embodiment 5 of the present invention where notation Dxy represents a nozzle and nozzles D11 through D66 are installed in a printhead. The nozzles are arranged in a matrix in which an interval between contiguous nozzles in the sub scan direction is designated by notation k (dots), an interval between contiguous nozzles in the main scan direction is designated by notation j (dots), a number of the nozzles in the sub scan direction is designated by notation N and a number of the nozzles in the main scan direction is designated by notation M. Further, an amount of feeding the receiving medium 5 in one motion is designated by P (dots) and a distance for moving the printhead in the main scan direction after finishing one dot until a successive dot is formed in the case where one of the nozzles forms dots by ejecting ink onto the receiving medium 5, is designated by notation Q (dots). In this case, k, j, N, M, P and Q satisfy the following relationships.

(1) k and N are positive integers mutually prime with each other.

(2) N=P+1

(3) j and Q are positive integers mutually prime with each other.

(4) M=Q+1

In respect of relationships between k and j, N and M, and P and Q, the components of the pairs may be the same as each other or different from each other. An explanation will be given of Embodiment 5 in respect of the case where k=j=4 (dots), P=Q=5 (dots) and N=M=6 as an example. The constitution of the printhead and the constitution of other portions of the multiple element printer are same as those in Embodiment 1 except the operation of the control unit.

Next, an explanation will be given of the operation in reference to the drawing. The image printing is conducted by moving the printhead in the main scan direction while ejecting ink onto the receiving medium 5 based on information data expressing image or letter information. The printhead 1 is moved in a continuous operation at a constant speed. At this moment, during a time period from when an nozzle forms one dot to when a successive dot is formed, the scan motor 3 is driven at a speed for moving the printhead by Q=5 dots. The other operations are the same as those in Embodiment 1.

Figures 11A, 11B:
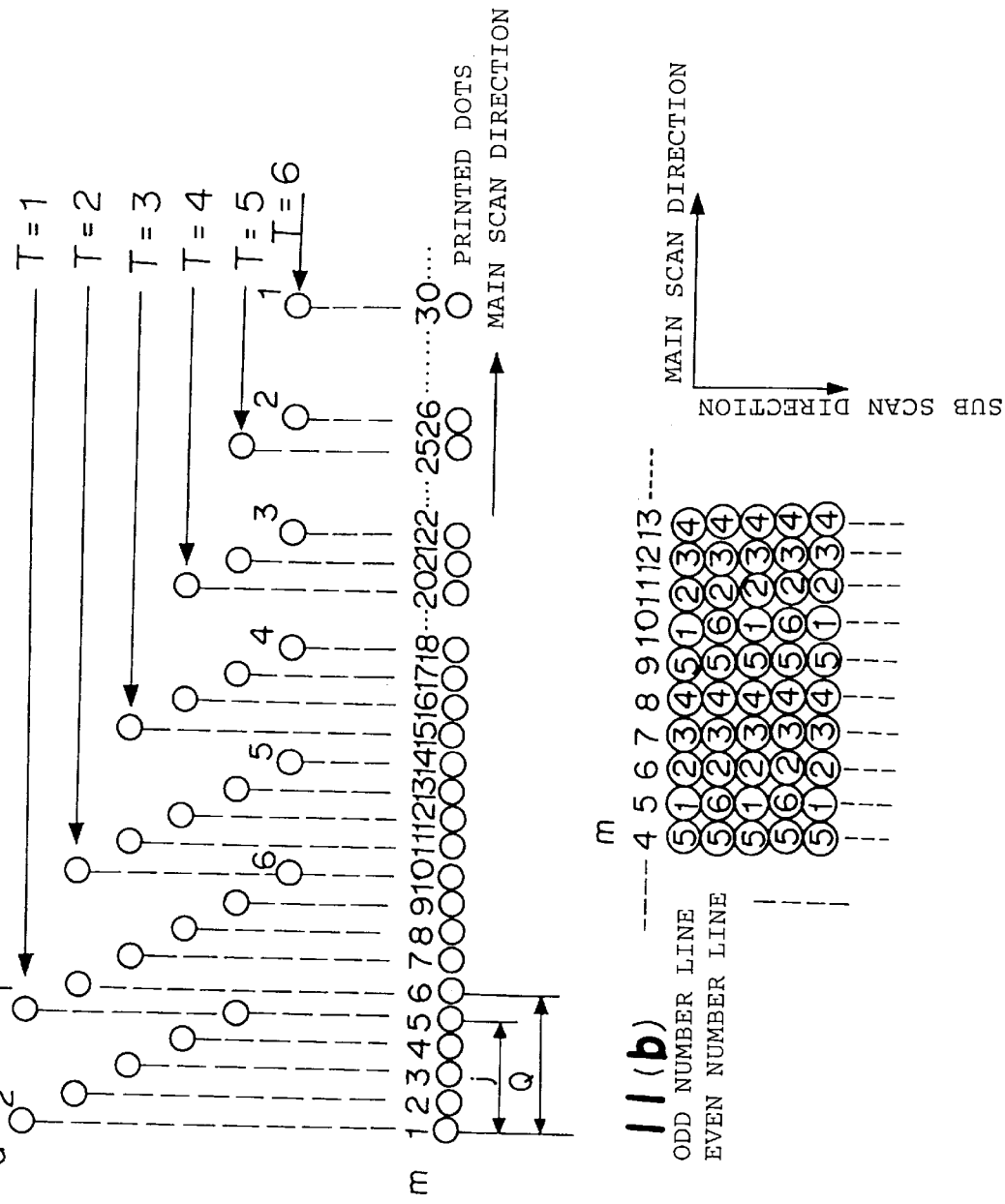
FIGS. 11(a) and 11(b) are views for explaining printing operation of a multiple element printer according to Embodiment 5 of the present invention.

FIGS. 11(a) and 11(b) are explanatory diagrams for explaining the printing operation of the multiple element printer according to Embodiment 5 of the present invention in which a printing result in the main scan direction when the printing operation is conducted by the printhead shown by Embodiment 5, is illustrated. FIG. 11(a) is an explanatory view for explaining the printing operation of one row of a group of nozzles, that is, nozzles of D16 through D66 illustrated by FIG. 10. As mentioned above, N=M=6 in respect of the number of nozzles, notation m designates a printed dot that is printed by each of the nozzles and notation T designates a number of ejecting ink in the main scanning. j=4 (dots) in respect of the interval between the contiguous nozzles and Q=5 (dots) in respect of the distance of moving the printhead in the main scan direction during a time period from when one nozzle forms one dot to when a successive dot is formed. Dots are formed also in the main scan direction similar to the above-described printing operation in the sub scan direction. In this case, the first nozzle and the sixth nozzle print the same position in the main scan direction also with respect to the main scan direction similar to the printing operation in the sub scan direction. The above-described same positions correspond to positions of m=5, 10, 15, . . . shown by FIG. 11(a). The first nozzle and the sixth nozzle alternately print dots at the printing positions of m=5 and m=10 similar to the above-described printing method in the sub scan direction. As shown by FIG. 11(b), the processing circuit is controlled such that when lines at the odd ordinal numbers in the whole printing region are printed by a group of nozzles at one row in the main scan direction, the printing operation is conducted by the first nozzles in the main scan direction, that is, the nozzles at x=1 in the nozzles Dxy in FIG. 10 and when lines at even ordinal numbers are printed, the printing operation is conducted by the sixth nozzles, that is, the nozzles at x=6 in the nozzles Dxy of FIG. 10. Thereby, the first nozzles and the sixth nozzles in the main scan direction can print dots alternately at the same positions.

The printing speed in one main scanning operation can be accelerated and a high-speed printing device can be obtained by constituting the multiple element printer as described above. Further, the printing operation in the main scan direction is conducted similar to that in the sub scan direction and therefore, even if an error is caused in the moving speed of the printhead, the continuity of the printed dots in the main scan direction is not deteriorated, the occurrence of streaks can be prevented and further, images having stabilized high image quality can be obtained. Incidentally, although the printhead in the case where j=4 (dots), Q=5 (dots) and M=6 has been described as an example in Embodiment 5, any values may be selected in respect of the values of j, M and Q so far as the above-described relationships are satisfied. Also, the multiple element printer is naturally adaptable to color printing.

Embodiment 6

Figure 12:
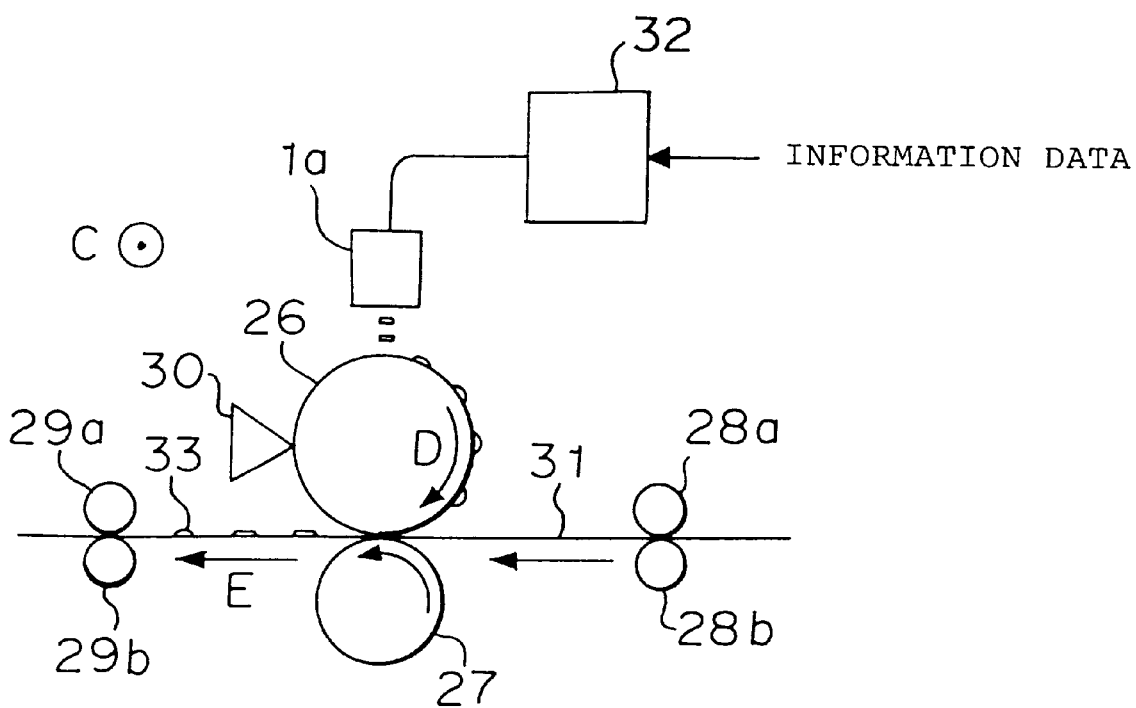
FIG. 12 is a constitutional view showing a multiple element printer according to Embodiment 6 of the present invention.

An explanation will be given of a multiple element printer according to Embodiment 6 of the present invention in reference to the drawings. FIG. 12 is a constitutional diagram showing a multiple element printer according to Embodiment 6 of the present invention. In FIG. 12, notation 1a designates a printhead having a plurality of nozzles for ejecting ink as printing elements, numeral 26 designates a print roller as an intermediate transfer medium where printed dots are formed by the printhead 1, numeral 27 designates a transfer roller that is a transfer means for transferring a receiving medium 31 and transferring the dots formed on the print roller 26 to the receiving medium 31, notations 28a and 28b designate feed rollers for feeding the receiving medium 31, notations 29(a) and 29(b) designate eject rollers for ejecting the receiving medium 31, numeral 30 designates a cleaning unit for absorbing ink remaining on the above-described print roller 26, numeral 31 designates the receiving medium and numeral 32 designates a control unit for driving the printhead 1 to eject ink based on information data expressing image or letter information and moving the print roller 26 and the printhead 1 relative to each other.

Next, an explanation will be given of the operation in reference to the drawing. N of nozzles as printing elements for ejecting ink to the receiving medium 31 are arranged in the printhead 1a. Any method may be selected for ejecting ink, for example, ejecting ink by generating a pressure by using an electricity-mechanical converting element such as a piezoelectric element, a electricity-heat converting element whereby the pressure is applied on ink by heated steam or the like. The control unit 32 generates drive signals for actually driving the respective nozzles in the printhead 1 based on information data expressing image or letter information, outputs the drive signals to the printhead 1 and ejects ink on the surface of the print roller 26 whereby printed images are formed. When the control unit 32 drives a scan motor, not illustrated, for moving the printhead 1, the printhead 1 is moved in C direction (main scan direction) illustrated in the drawing while ejecting ink by which one operation of image printing is conducted. When the one operation of image printing has been finished, the control unit 32 drives a driving motor, not illustrated, for rotating the print roller 16 by which the print roller 26 is rotated in D direction illustrated in the drawing by an angle corresponding to a constant distance (P dots) on the periphery and returns the printhead 1 to the initial position. Next, the control unit 32 makes the printhead 1 eject ink while moving the printhead 1 again, by which a second image printing operation is conducted. Thereafter, the operation of rotating the print roller 26 by the angle corresponding to the constant distance (P dots) on the periphery after finishing the one image printing operation and these operations are repeated until printing of all the information data has been finished.

The constitution of the printhead 1 and the method of printing dots on the surface of the print roller 26 are the same as those in Embodiment 1 and printed images similar to those in Embodiment 1 are formed on the surface of the print roller 26.

The receiving medium 31 is fed by the feed rollers 28a and 28b and is transferred between the print roller 26 and the transfer roller 27. The transferred receiving medium 31 is transferred in an arrow mark E direction at a speed the same as the peripheral speed of the print roller 26 and in synchronism with the print roller 26 by the same pitch of P dots by the print roller 26 and the transfer roller 27. At this moment, the printed dots formed on the print roller 26 are transferred onto the receiving medium 31 by pressing the transfer roller 27 to the receiving medium 31, final printed dots 33 are formed and the receiving medium is ejected by the eject rollers 29a and 29b. A portion of the surface of print roller 26 where the printed dots have been transferred onto the receiving medium 31, are cleaned in respect of the surface at the cleaning unit 30 and dots are formed again by the printhead 1a.

According to Embodiment 6, the printed dots are formed once on the surface of the print roller 26 by ejecting ink and thereafter, the dots are transferred onto the receiving medium 31 by pressing the transfer roller 27 to the receiving medium 26. Accordingly, the image printing onto the receiving medium 31 can firmly be performed by the pressing force even in the case where ink having poor absorbability in respect of the receiving medium 31 is used. As a result, an effect capable of diversifying choice of ink for obtaining printed image having high image quality, is achieved. Incidentally, although an explanation has been given of the printhead 1 where the printing elements are arranged in one row in Embodiment 6 as an example, the printhead 1 is not limited thereto but a printhead where printing elements are arranged in a matrix may be used.

Embodiment 7

Figure 13:
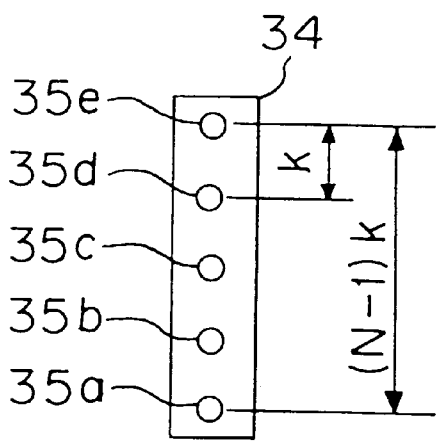
FIG. 13 is a constitutional view showing a printhead according to Embodiment 7 of the present invention.

An explanation will be given of a multiple element printer according to Embodiment 7 of the present invention in reference to the drawings as follows. FIG. 13 is a constitutional view showing a printhead 34 of a multiple element printer according to Embodiment 7 of the present invention. In FIG. 13, numeral 34 designates a printhead having a plurality of nozzles for ejecting ink as printing elements, and notations 35a through 35e designate respective nozzles as printing elements.

In performing interlace printing, the following relationship must be satisfied between an interval between contiguous nozzles k (dots) and a number of nozzles N.

(1) k and N are positive integers mutually prime with each other.

An explanation will be given of the case of k=4 (dots) and N=5 in Embodiment 7.

Figure 14:
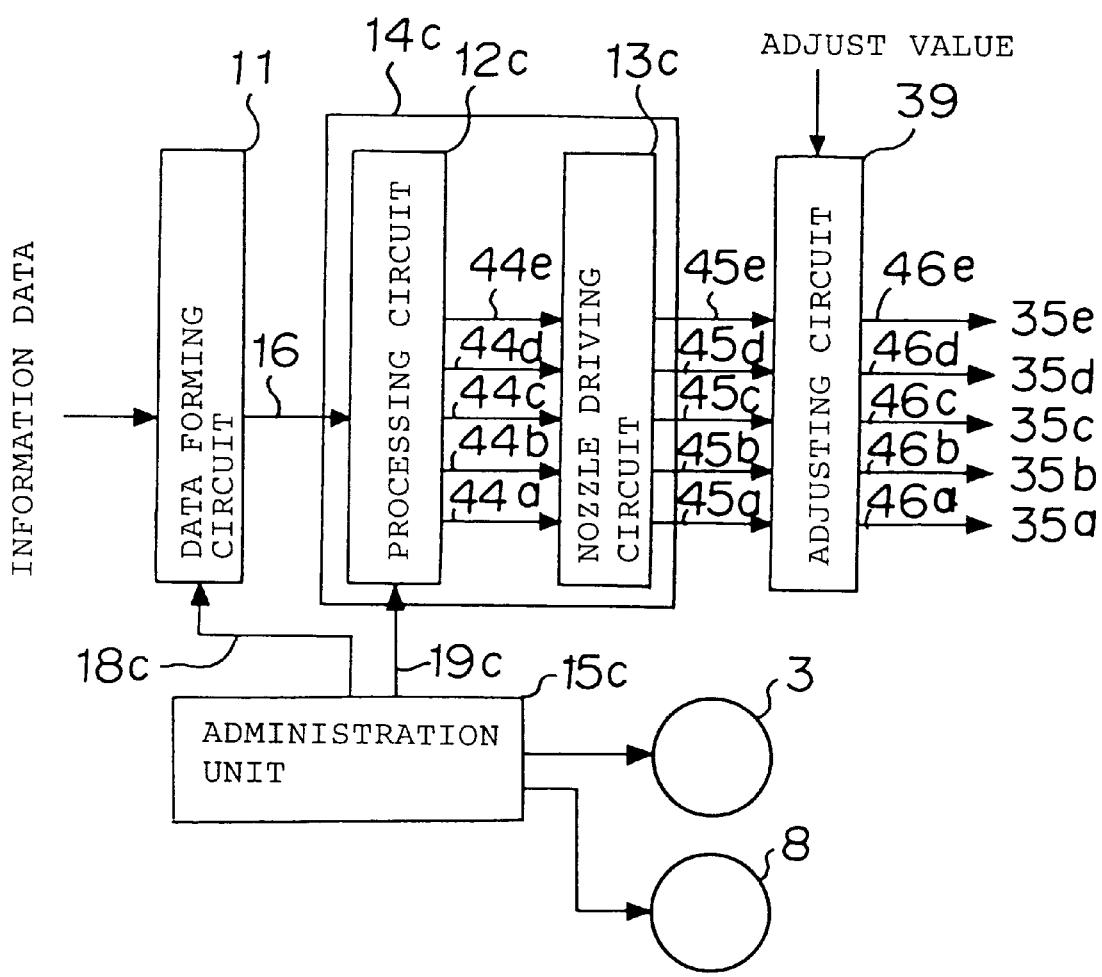
FIG. 14 is a constitutional view showing a multiple element printer according to Embodiment 7 of the present invention.

FIG. 14 is a constitutional view showing a multiple element printer according to Embodiment 7 of the present invention where notations the same as those in FIG. 3 designate the same or the corresponding portions and an explanation thereof will be omitted. In FIG. 14, notation 12c designates a processing circuit as a processing means for reading data 16 by selecting information data in accordance with arrangement of the nozzles in the printhead 34 from the data forming circuit 11 and outputting printing data 44a through 44c in correspondence with the respective nozzles 35a through 35e, notation 13c designates a nozzle driving circuit for generating drive signals 45a through 45e for actually driving the nozzles 35a through 35e based on the printing data 44a through 44e, notation 14c designates a printing element drive signal forming means comprising the processing circuit 12c and the nozzle driving circuit 13c, numeral 39 designates an adjusting circuit as a dot diameter adjusting means for outputting output signals 46a through 46e to the nozzles 35a through 35e by changing voltage values of the drive signals 45a and 45e in accordance with inputted set values with respect to the drive signals 45a through 45e, notation 15c designates an administration unit as a controlling means for controlling the scan motor 3 and the feed motor 8 and starting up the data forming circuit 11 and the processing circuit 12c, notation 18c designates a start signal for staring up the data forming circuit 11 and notation 19c designates an instruction signal for instructing to which nozzles ink is to be ejected.

Next, an explanation will be given of the operation in reference to the drawings. When information data is inputted, the data is stored in the data forming circuit 11. When the administration unit 15c outputs the start signal 18c to the data forming circuit 11, the data forming circuit 11 successively reads the information data in correspondence with 1 line of dots which are to be printed by the respective nozzles 35a through 35e at the printhead 34 and outputs the information data to the processing circuit 12c as the data 16. When the data 16 is inputted to the processing circuit 12c, the data 16 is distributed in accordance with the respective nozzles and outputted as the printing data 44a through 44e to the nozzle driving circuit 13c when the instruction signal 19c is inputted from the administration unit 15c. The printing data 44a through 44e are data only showing whether ink is to be ejected or not and "1" is outputted when ink is to be ejected and "0" is outputted when ink is not to be ejected. Here, the instruction signal 19c is a signal of 5 bits where the lowest bit corresponds to the nozzle 35a and the highest bit corresponds to the nozzle 35e, respectively. Printing data in correspondence with the data 16 is outputted to nozzles where "1" is described by the instruction signal 19c and printing data prohibiting to eject ink to all of 1 line of dots is outputted to nozzles where "0" is described thereby. When the printing data 44a through 44e is inputted to the nozzle driving circuit 13c, the drive signal 45a through 45e for actually driving the respective nozzles in accordance with data values are generated and outputted.

Certain adjust values are given from outside to the adjusting circuit 39 by, for example, variable resistors. When the drive signals 45a through 45b are inputted to the adjusting circuit 39, the voltage values of the drive signal 45a of the nozzle 35a and the drive signal 45e of the nozzle 35e are changed based on the given adjust values and the other drive signals 45b through 45d stay with the voltage values as they are by which the partially modified drive signals 45a through 45e are outputted as the output signals 46a through 46e. When the signals 46a through 46e outputted from the adjusting circuit 39, are inputted to the printhead 34, ink is ejected from the nozzles 35a through 35e in accordance with voltage values of the drive signals in correspondence with the respective nozzles and dots are printed on the receiving medium. At this moment, if the voltage values of the output signals 46a and 46e are different from the voltage values of the other output signals, the printing operation is conducted with sizes of dot diameters printed by the nozzles 35a and 35e different from sizes of dot diameters printed by the other nozzles.

The administration unit 15c outputs the start signal 18c to the data forming circuit 11, successively operates the scan motor 3 and moves the printhead 34 in a constant direction (main scan direction). The administration unit 15c detects the amount of transfer of the printhead 34 in the main scan direction by monitoring a rotational angle of the scan motor 3 and outputs the instruction signal 19c to the processing circuit 12c such that when the printhead 34 is moved to a position where a dot is initially formed, the printing data 44a through 44e are outputted to the nozzle driving circuit 13c.

The nozzle driving circuit 13c generates the drive signals 45a through 45e for actually driving the nozzles 35a through 35e in accordance with the printing data outputted from the processing circuit 12c and outputs the signals to the printhead 34 by which the respective nozzles carry out an operation of printing 1 line of dots. Next, the administration unit 15c drives the feed motor 8 and moves the receiving medium in the sub scan direction by lines of N=5, returns the printhead 34 to the initial position and repeats again the above-described printing operation.

Figures 15A, 15B:
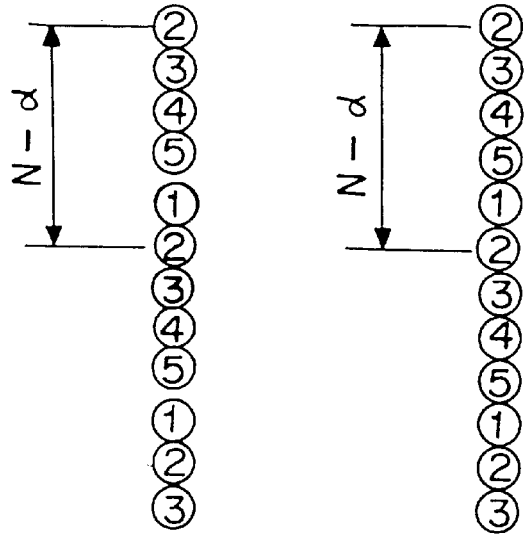
FIGS. 15(a) and 15(b) are views for explaining printing operation of the multiple element printer according to Embodiment 7 of the present invention.
Figure 22:
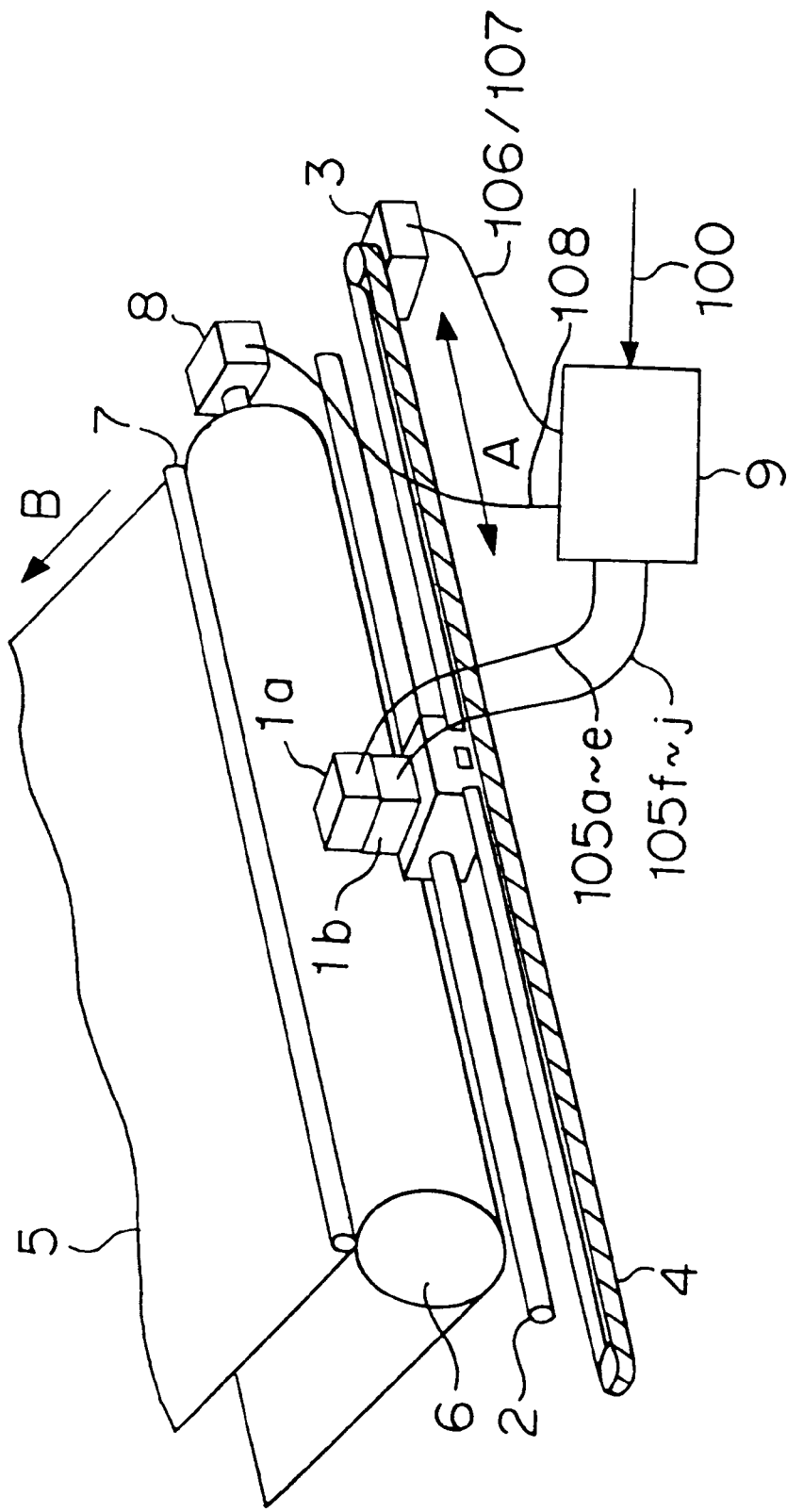
FIG. 22 is a constitutional view of a multiple element printer according to an embodiment of the present invention.

The interlace printing as shown by FIG. 22 can be executed by carrying out the above-described printing operation. However, in such an interlace printing, when an error is caused in the amount of feeding the receiving medium in the sub scan direction, the continuity of printed dots in the sub scan direction is lost whereby streaks are formed and image quality is deteriorated. FIG. 15(a) shows an example of printing dots in the case where the actual feed amount is smaller than the regular amount of feeding the receiving medium N (=5 lines) by α where the continuity is deteriorated between a dot printed by a first nozzle and a dot printed by a fifth nozzle. FIG. 15(b) shows an example of printing dots in the case where sizes of dot diameters of dots printed by the first nozzle and the fifth nozzle are made larger than sizes of dot diameters printed by the other nozzles by giving adjust values whereby occurrence of streaks is effectively prevented by enlarging the sizes of the dot diameters.

Figures 16A, 16B:
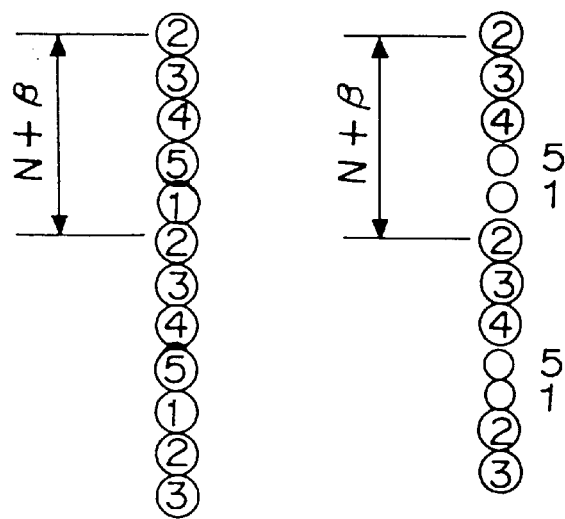
FIGS. 16(a) and 16(b) are diagrams for explaining printing operation of other example of the multiple element printer according to Embodiment 7 of the present invention.

FIG. 16(a) shows an example of printing dots in the case where the actual feed amount is longer than the regular amount of feeding the receiving medium N (=5 lines) where the interval between a dot printed by the first nozzle and a dot printed by the fifth nozzle is conversely narrowed whereby the continuity of printed dots in the sub scan direction is deteriorated. FIG. 16(b) shows an example of printing dots in the case where the sizes of the dot diameters of the dots printed by the first nozzle and the fifth nozzle are made smaller than the sizes of the dot diameters printed by the other nozzles by giving adjust values by which occurrence of streaks is prevented by decreasing the sizes of the diameters. When the adjustment of the sizes of the dot diameters is actually conducted, set values are changed while printing information data for adjusting image quality and the adjustment of the sizes of the dot diameters is finished when the occurrence of streaks is eliminated.

The occurrence of streaks is prevented even in the case where an error is caused in the feed accuracy of the receiving medium or the accuracy of installing the printhead 34 by constituting the multiple element printer performing the interlace printing as described above and adverse influence is not manifested in printed images whereby images having stable image quality are obtained. Although Embodiment 7 has been explained with an example of the printhead in the case where k=4 (dots) and N=5, any values may be selected in respect of the values of k and N so far as the values satisfy the above-described relationship. Also, the multiple element printer is naturally adaptable to color printing.

Furthermore, although an explanation has been given of Embodiment 7 with an example of the ink jet head for ejecting ink as a group of printing elements, a group of printing elements using a thermal head may be used.

Embodiment 8

An explanation will be given of a multiple element printer according to Embodiment 8 of the present invention in reference to the drawings. FIG. 17 is a constitutional view showing a multiple element printer according to Embodiment 8 of the present invention where notations the same as those in FIG. 14 designate the same or the corresponding portions and an explanation thereof will be omitted. In FIG. 17, numeral 49 designates an adjusting circuit as a dot diameter adjusting means in which with respect to the drive signals 45a through 45e, voltage values of the drive signals 45a and 45e are changed in accordance with inputted first set values and voltage values of the drive signals 45b and 45d are changed in accordance with inputted second set values whereby output signals 50a through 50e are outputted to the nozzles 35a through 35e and other constitutions are the same as those in Embodiment 7.

Next, an explanation will be given of the operation in reference to the drawings. A series of operations from storing information data to the data forming circuit 11 to generating the drive signals 45a through 45e and outputting them by the nozzle driving circuit 13c, are the same as those in Embodiment 7.

Two kinds of adjust values are given from outside to the adjusting circuit 49 by, for example, variable resistors as first set values and second set values. When the drive signals 45a through 45e are inputted to the adjusting circuit 49, the voltage values of the drive signal 45a of the nozzle 35a and the drive signal 45e of the nozzle 35e are changed based on the given first set values and the voltage values of the drive signal 45b of the nozzle 35e and the drive signal 45d of the nozzle 35d are changed based on the second set values and the voltage value of the other drive signal stays as it is and the drive signals 45a through 45e are outputted as output signal 50a through 50e. When the output signals 50a through 50e outputted from the adjusting circuit 49 are inputted to the printhead 34, the nozzles 35a through 35e eject ink in accordance with the voltage values of the drive signals in accordance with the respective nozzles by which dots are printed on the receiving medium. In this case, when the voltage values of the output signals 50a, 50b, 50d and 50e are different from the voltage value of the other output signal, a printing operation is conducted with sizes of diameters of dots printed by the nozzles 35a, 35b, 35d and 35e different from a size of a dot diameter of a dot printed by the other nozzle. The nozzle 35a and the nozzle 35e share the same size of the dot diameter and the nozzle 35b and the nozzle 35d share the same size of the dot diameter that is different from the size of the dot diameter described immediately above. The other operations for conducting image printing are the same as those in Embodiment 7.

Figure 18A:
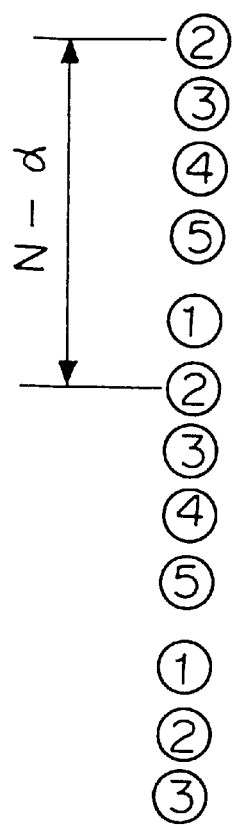
FIGS. 18(a) and 18(b) are views for explaining printing operation of the multiple element printer according to Embodiment 8 of the present invention.
Figure 18B:
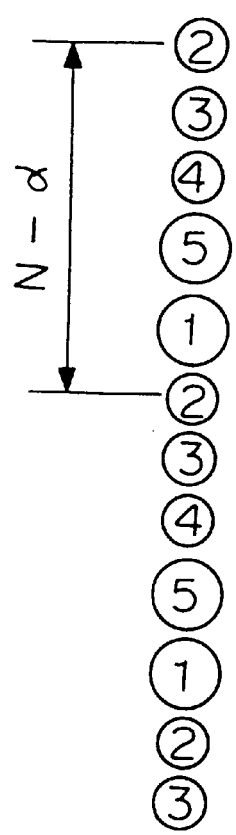
Figure 20:
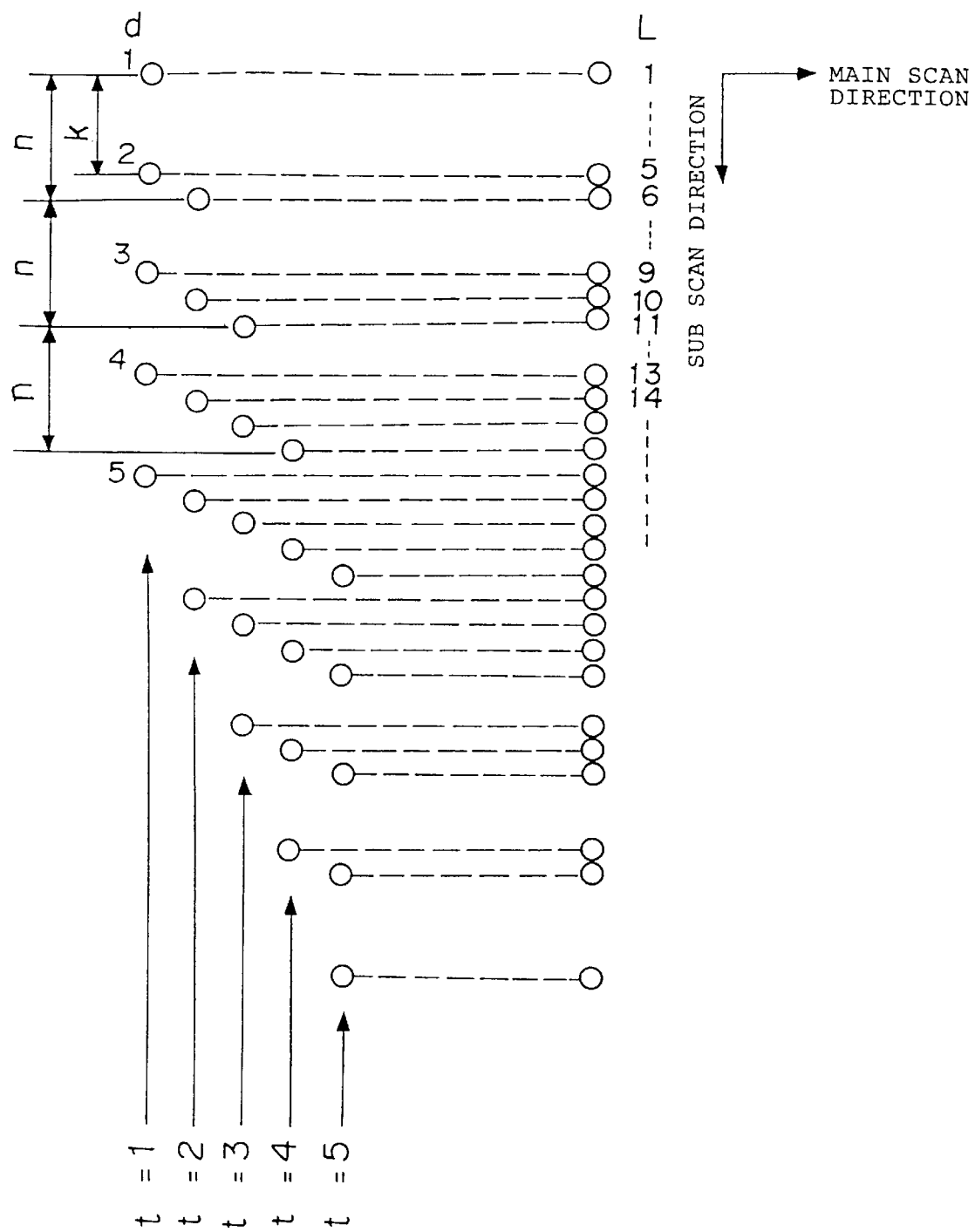
FIG. 20 is an explanatory view for explaining a conventional interlace printing operation.
Figure 21:
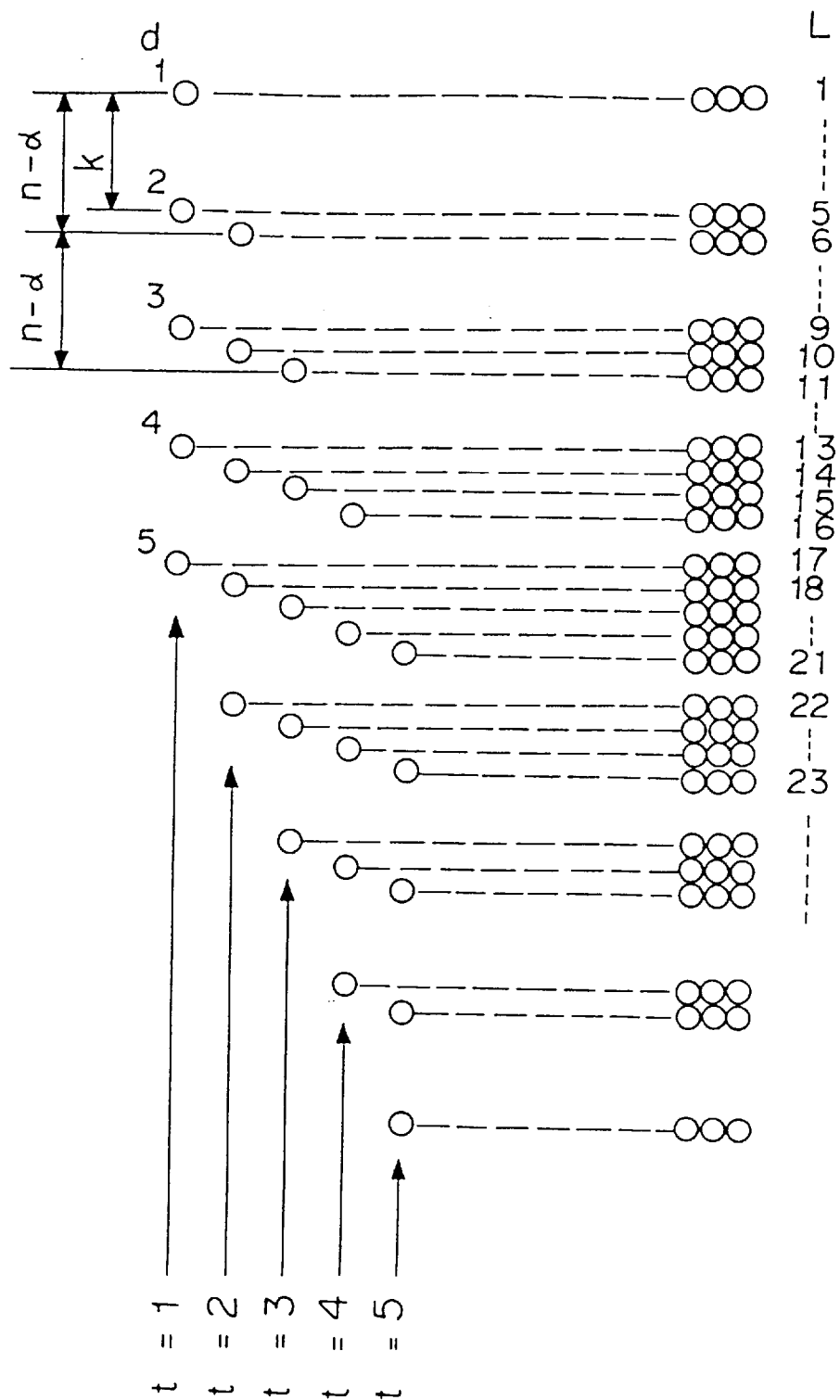
FIG. 21 is an explanatory view for explaining problematic points in conventional interlace printing operation.

The interlace printing as shown by FIG. 20 can be conducted by executing the above-described printing operation. However, according to the interlace printing shown by FIG. 20, when an error is caused in the amount of feeding the receiving medium in the sub scan direction, the continuity of the printed dots in the sub scan direction is lost whereby streaks are formed and image quality is deteriorated. FIG. 18(a) shows an example of printing dots in the case where the actual feed amount is smaller than the regular amount of feeding the receiving medium N (=5 lines) by α where the continuity is deteriorated between a dot printed by the first nozzle and a dot printed by the fifth nozzle. FIG. 18(b) shows an example of printing dots in the case where sizes of dot diameters of dots printed by the first nozzle and the fifth nozzle are enlarged and sizes of dot diameters of dots printed by the second nozzle and the fourth nozzle respectively contiguous to the dots printed by the first nozzle and the fifth nozzle, are conversely decreased. When the sizes of the dot diameters of the dots printed by the first nozzle and the fifth nozzle are enlarged, portions thereof overlapping with the contiguous dots are increased which may become sources of occurrence of new streaks. Hence, the occurrence of streaks can effectively be prevented by adjusting the sizes of the dot diameters in respect of the contiguous dots in the reverse direction.

When the actual feed amount is larger than the regular amount of feeding the receiving medium N (=5 lines), an operation reverse to above-described adjustment is conducted. That is, the sizes of the dot diameters of the dots printed by the first nozzle and the fifth nozzle are decreased and the sizes of the dot diameters of the dots printed by the second nozzle and the fourth nozzle respectively contiguous to the dots printed by the first nozzle and the fifth nozzle, are conversely enlarged by which the occurrence of streaks can be prevented.

The occurrence of streaks can be prevented even in the case where an error is caused in the feed accuracy of the receiving medium 5 and the accuracy of installing the printhead 34 by constituting the multiple element printer executing the interlace printing as described above by which adverse influence thereof is restrained in respect of printed images and images having further stabilized image quality can be obtained.

Embodiment 9

Figure 23:
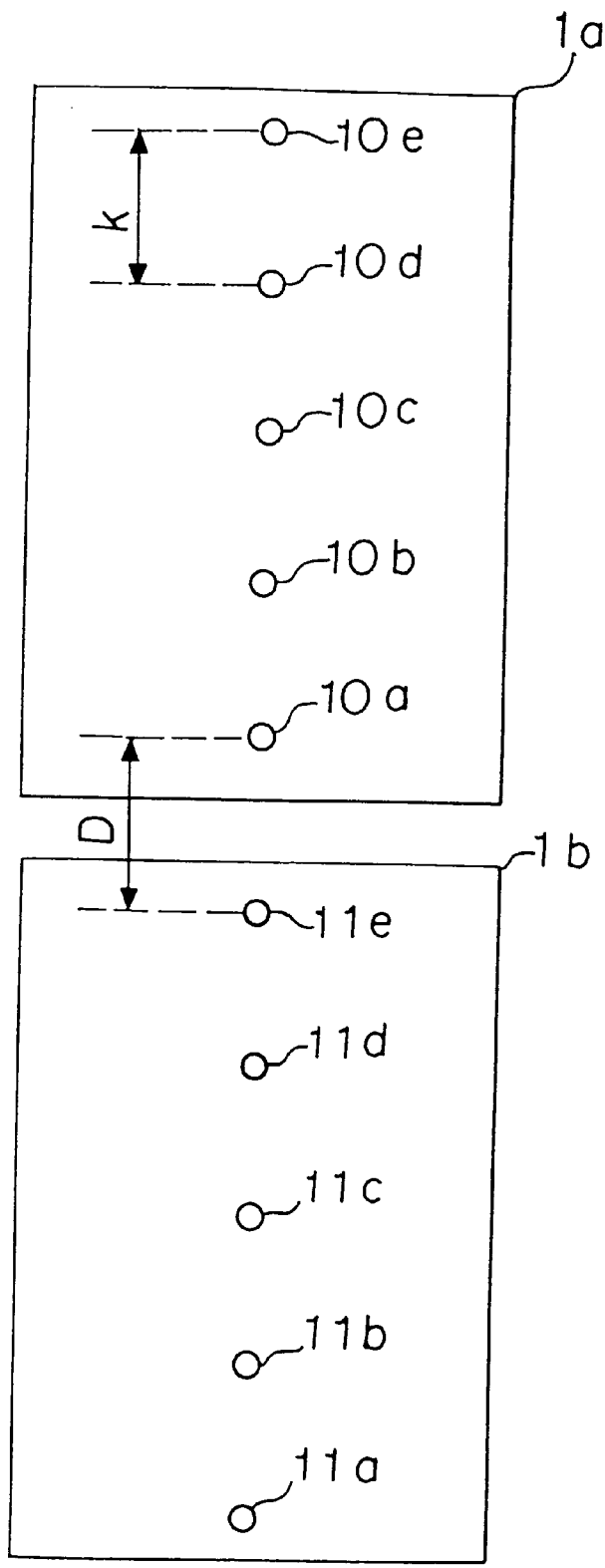
FIG. 23 is a view for explaining arrangement of printing elements included in printheads illustrated by FIG. 22.

According to a multiple element printer in Embodiment 9 of the present invention, as illustrated by FIG. 22, there are arranged a plurality of printheads, for example, printheads 1a and 1b each having as printing elements a plurality of ink jet nozzles ejecting ink to a receiving medium by a pressure generated by an electricity-mechanical converting element (piezoelectric element or the like) or a electricity-heat converting element (ink pressurizing element in use of heat or the like) satisfying the following conditions. Referring to FIG. 23, the conditions are ① an interval between printing elements k (dots) and a number of printing element n are integers mutually prime with each other, ② an interval D (dots) between an Nth printing element of a first printhead and a 1st printing element of a second printhead contiguous to the first printhead, and k are integers mutually prime with each other, and ③ a number of printheads m is formed by dividing k by an integer that is equal to or larger than 2 (for example, m=2, n=5, k=6 and D=7). The head supporting/guiding shaft 2 supports the respective printheads 1a and 1b and guides them in the main scan direction (arrow mark A). The scan motor 3 transmits a drive force via the drive belt 4 in accordance with a drive signal 106 inputted from a control means 9 by which the respective printheads 1a and 1b are moved in the main scan direction (arrow mark A). Further, a signal 107 detecting the amount of movement of the printheads 1a and 1b in the main scan direction by monitoring a rotational angle by, for example, a rotary encoder or the like, is outputted to the control means 9. The feed rollers 6 and 7 are driven by the feed motor 8, support the printing medium 5 and moves it in the sub scan direction (arrow mark B). The feed motor 8 rotates the feed rollers 6 and 7 in accordance with a drive signal 108 inputted from the control means 9. When the control means 9 has finished a first image printing operation by the printheads 1a and 1b moving in the main scan direction by the driving scan motor 3 in accordance with the signal 107 for detecting the amount of movement of the printheads in the main scan direction by monitoring the rotational angle, the receiving medium 5 is fed by the driving feed motor 8 by the feed amount of P dots (P=n×m) and printing element drive signals 105a through 105j formed based on inputted information data 100 are outputted to the printheads 1a and 1b. Dispersion of the printing elements and dispersion in fabricating the respective printheads are made uniform by using different printing elements printing contiguous lines whereby stable image quality is provided. Further, high-speed printing can be performed by increasing the amount of feed of the printheads in the sub scan direction by a unit feed amount of the printhead multiplied by the number of the printheads. Moreover, the present invention lowers fabrication yield and achieves reduction in cost without adopting a printing element number increase system by high-density formation of the printing elements or prolongation of the printheads.

The multiple element printer in accordance with Embodiment 9 adopts a system of driving the respective printing elements of the printheads (high-density printing system by controlling printing operation). Printheads of a number m (m=k/j, j is an integer of 2 or more) each of which is arranged with the printing elements of a number m at intervals of k dots (k and n are mutually prime with each other) in the sub scan direction, are arranged in the sub scan direction in which an interval between an nth printing element of a first printhead and a 1st printing element of a second printhead contiguous to the first printhead, is D dots (D and k are integers prime with each other) and a receiving medium is fed by a feed amount of P dots (P=n×m) in the sub scan direction at every time where the printheads are moved in the main scan direction.

Figure 24:
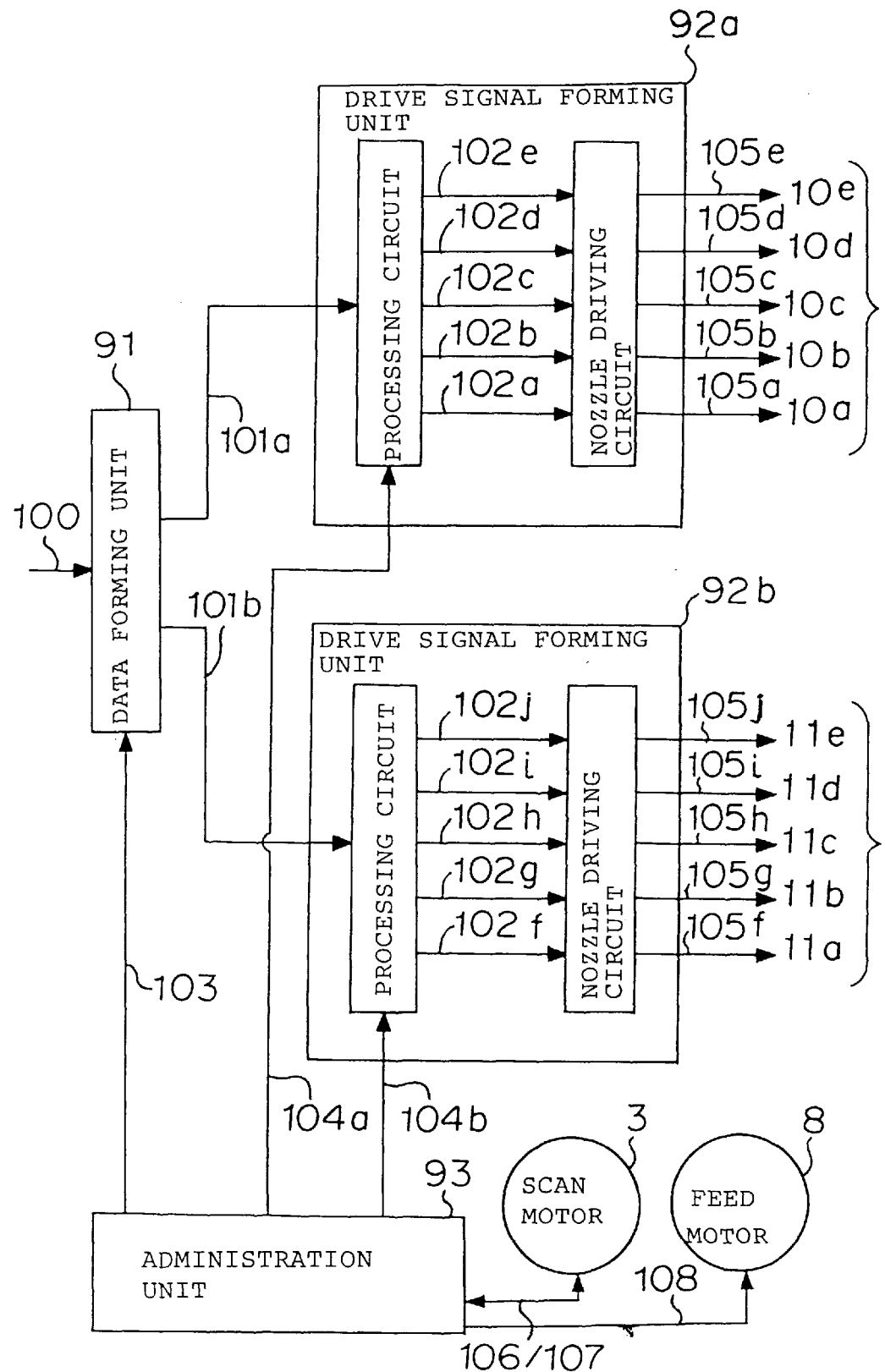
FIG. 24 is a functional block diagram of a controlling means shown by FIG. 22.
Figure 25:
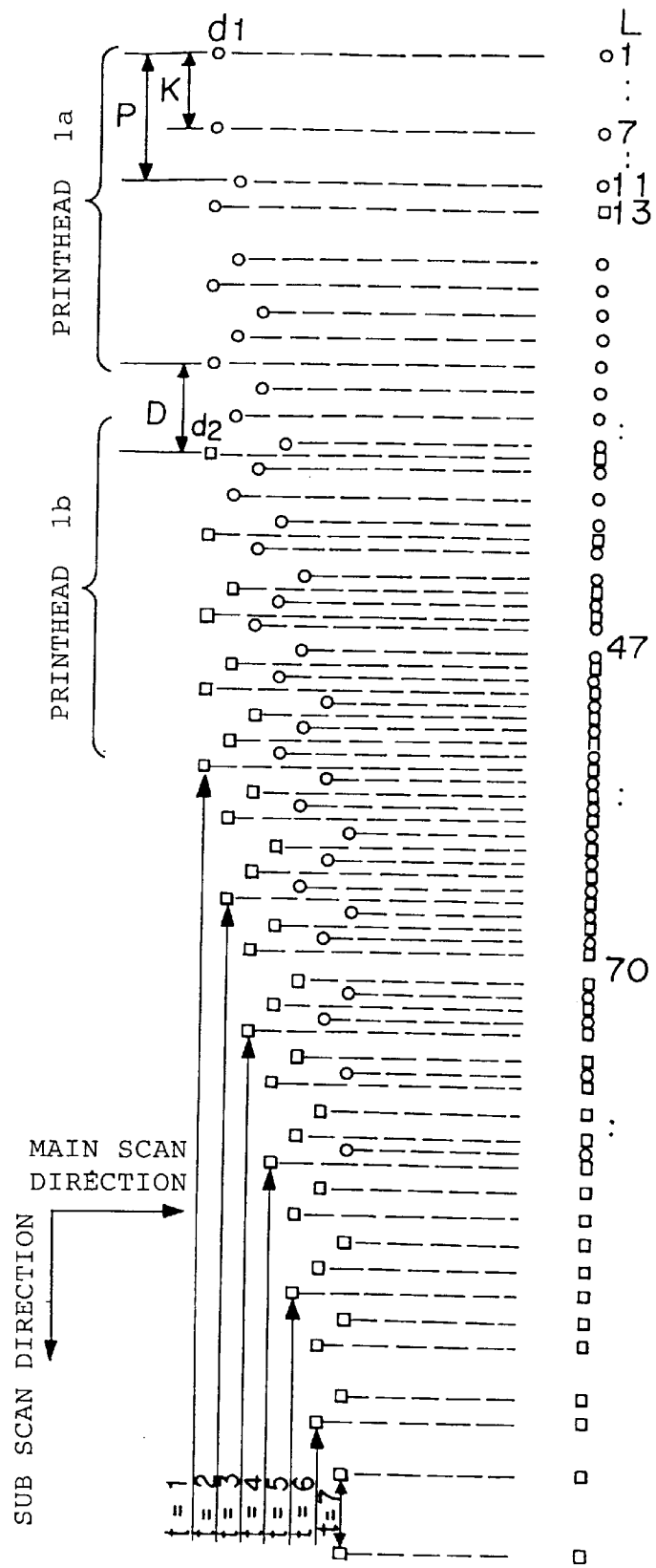
FIG. 25 is a view for explaining a print result in controlling printing operation of the controlling means as shown by FIG. 22.
Figure 26:
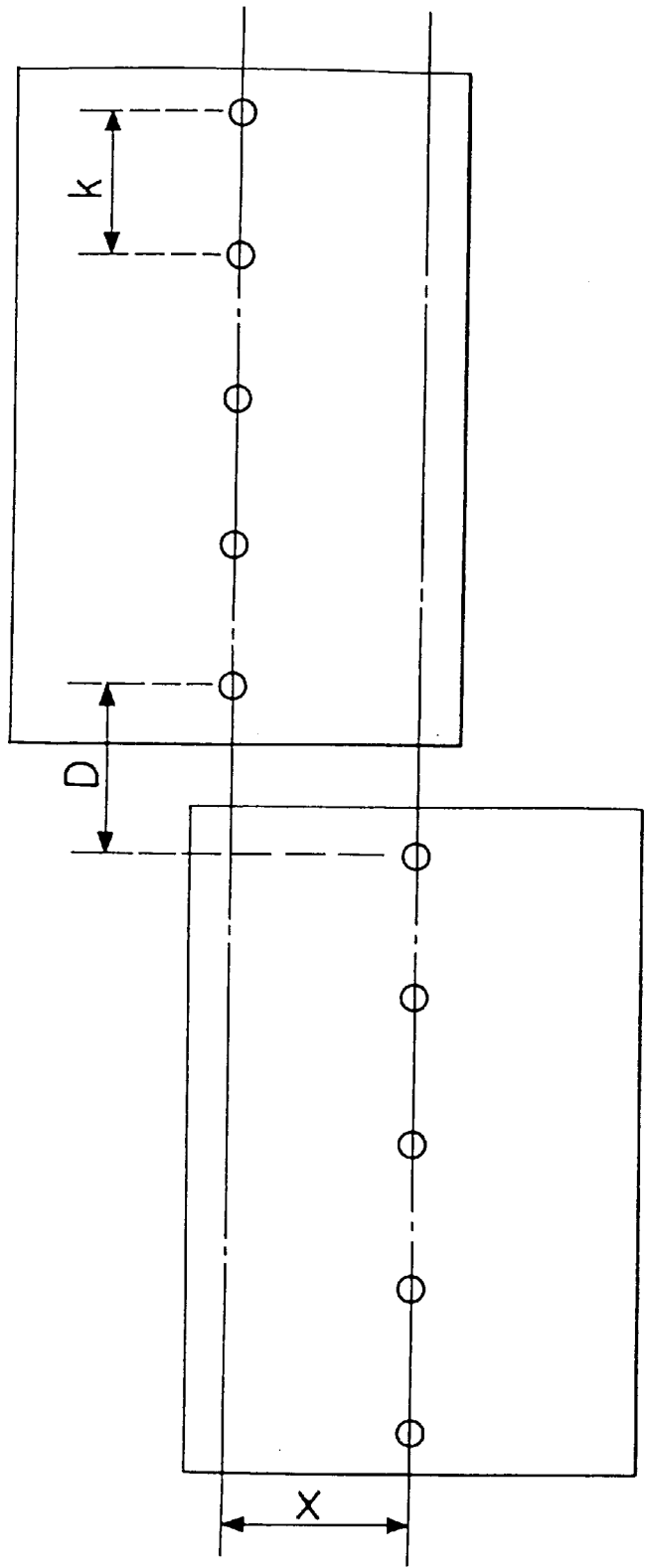
FIG. 26 is a view for explaining a positional relationship of the printheads shown by FIG. 22.

As illustrated by FIG. 24, firstly, the control means 9 successively reads information data corresponding to 1 line of dots and arrangement of nozzles to be printed by the nozzles 10a through 10f and 11a through 11f included in the printheads 1a and 1b in accordance with a start signal 103 issued by an administration unit 93 to a data forming unit 91 storing inputted information data 100 and outputs the information data as selection data 101a and 101b. Next, drive signal forming units 92a and 92b output the inputted selection data 101a and 101b by distributing them in respect of the nozzles in accordance with instruction signals 104a and 104b issued by the administration unit 93. Nozzle drive signals 105a through 105e and 105f through 105j issued by nozzle driving circuits actually driving the respective nozzles, which are formed in accordance with print data 102a through 102e and 102f through 102j by processing circuits where "1" is indicated when ink is ejected and "0" is indicated when ink is not ejected, are outputted to the nozzles 10a through 10f and 11a through 11f included in the printheads 1a and 1b which conduct 1 line of printing in one operation. Further, the administration unit 93 outputs a start signal 103 to the data forming unit 91, outputs a signal 106 for driving the scan motor 3, inputs a signal 107 for detecting the amount of movement of the printheads 1a and 1b in the main scan direction by monitoring the rotational angle of the scan motor, and outputs the instruction signals 104a and 104b for instructing to which nozzles ink is to be ejected to drive signal forming units 92a and 92b, when the printheads 1a and 1b are moved to initial dot forming positions on the receiving medium 5. The instruction signals 104a and 104b are signals each of 5 bits where the lowest bits correspond to the nozzles 10a and 11a and the highest bits correspond to the nozzles 10e and 11e and instruct the nozzles corresponding to the bit "1" or "0" to eject or not to eject ink. Further, the administration unit 93 outputs a signal 108 for driving the feed motor 8 by which the receiving medium 5 is moved in the sub scan direction by 10 dots and the printheads 1a and 1b are returned to initial positions. The above-described control of printing operation is repeated until printing of all the information data has been finished. As shown by FIG. 25, according to a result of printing in the control operation of printing (m=2, n=5, k=6, D=7 and P=10), a printed dot contiguous to a printed dot $d_1$ or $d_2$ in the sub scan direction, is printed by a nozzle that is always different from a nozzle for printing the printed dot $d_1$ or $d_2$ by which a print result the same as that in interlace printing is provided. Further, the actual effective print region corresponds to a print line L=47 and thereafter and therefore, the image printing is conducted only with respect to the effective print region by controlling print data of the respective nozzles by the instruction signals 104a and 104b such that dots are not printed with respect to print lines prior to L=47. Accordingly, contiguous lines are printed by using different printing elements and therefore, a dispersion in printing elements and a dispersion in fabricating respective printheads are made uniform by which stable image quality is provided. Further, as illustrated by FIG. 26, with respect to a positional relationship between the printheads, even if the positions of the plurality of printheads relative to each other are shifted by x dots in a direction orthogonal to the nozzle rows, image printing can be performed substantially on the same print lines when the control means 9 controls timings of ejecting ink by x dots so far as the positional relationship satisfies the above-described conditions of arrangement of printing elements.

Figure 27:
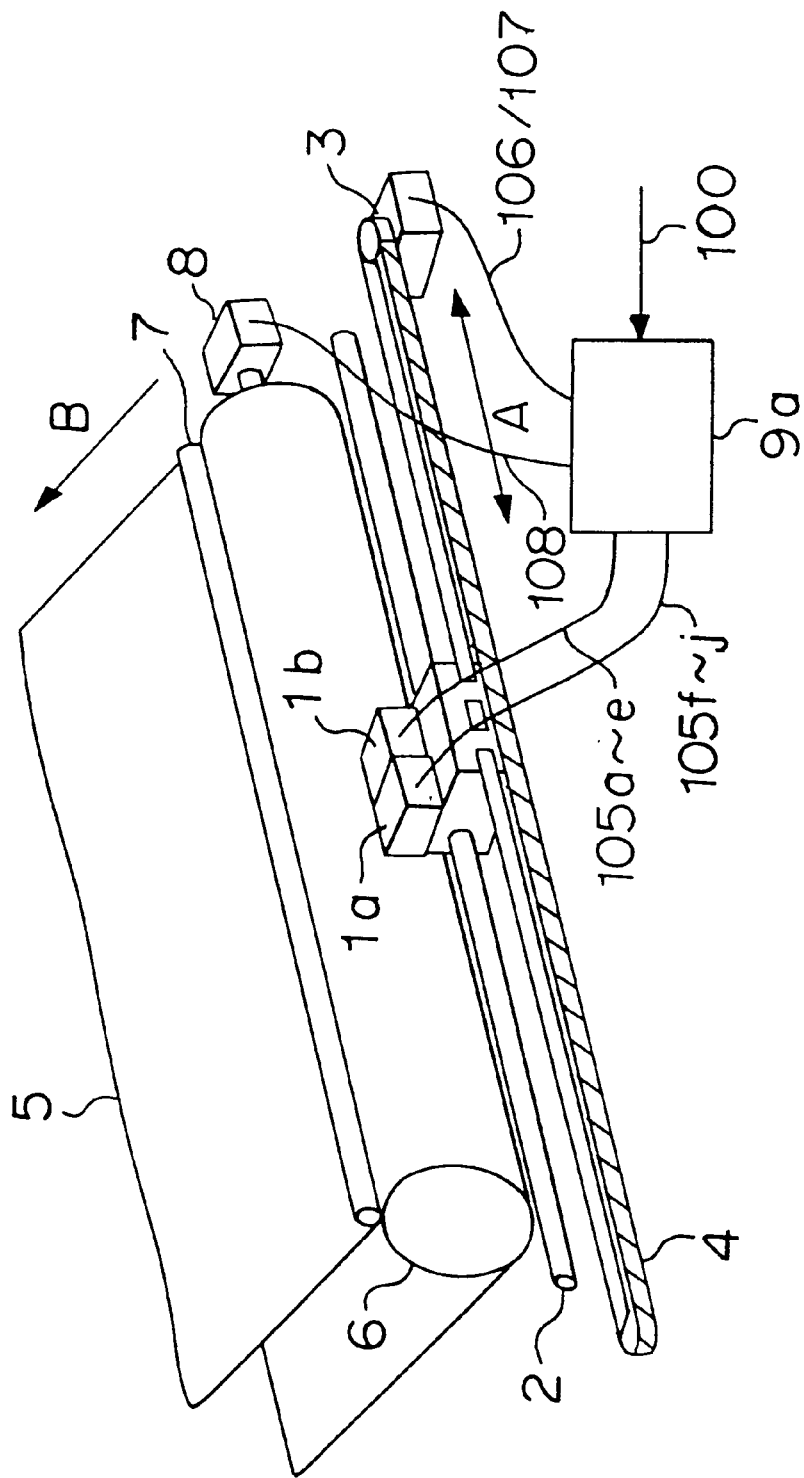
FIG. 27 is a constitutional view showing other embodiment of the present invention.

Further, an explanation has been given of Embodiment 9 of the present invention illustrated by FIG. 22 such that the control means 9 inputs the signal 107 for detecting the amount of movement of the printheads 1a an 1b in the main scan direction by monitoring the rotational angle of the scan motor and outputs the instruction signals 104a and 104b when the printheads 1a and 1b are moved to the initial dot forming positions on the receiving medium 5. However, as illustrated by FIG. 27, the control means 9 may be replaced by a control means 9a which measures the inputted detection signal 106 and outputs the instruction signal 104a and 104b at every time where the printheads 1a and 1b are moved by P dots (10 dots) in the main scan direction and printheads 1a and 1b arranged with the printing elements in the main scan direction instead of the sub scan direction, may be arranged in the main scan direction instead of the sub scan direction. By this constitution high-speed printing can be conducted by shortening a time period for printing in the main scan direction in one operation. Further, a time period required for one printing element for printing a successive image may be a time period for scanning the printheads corresponding to an interval of an amount of feeding the receiving medium (P dots) whereby reduction in cost can be achieved without particularly using high-speed printing elements.

Figure 28:
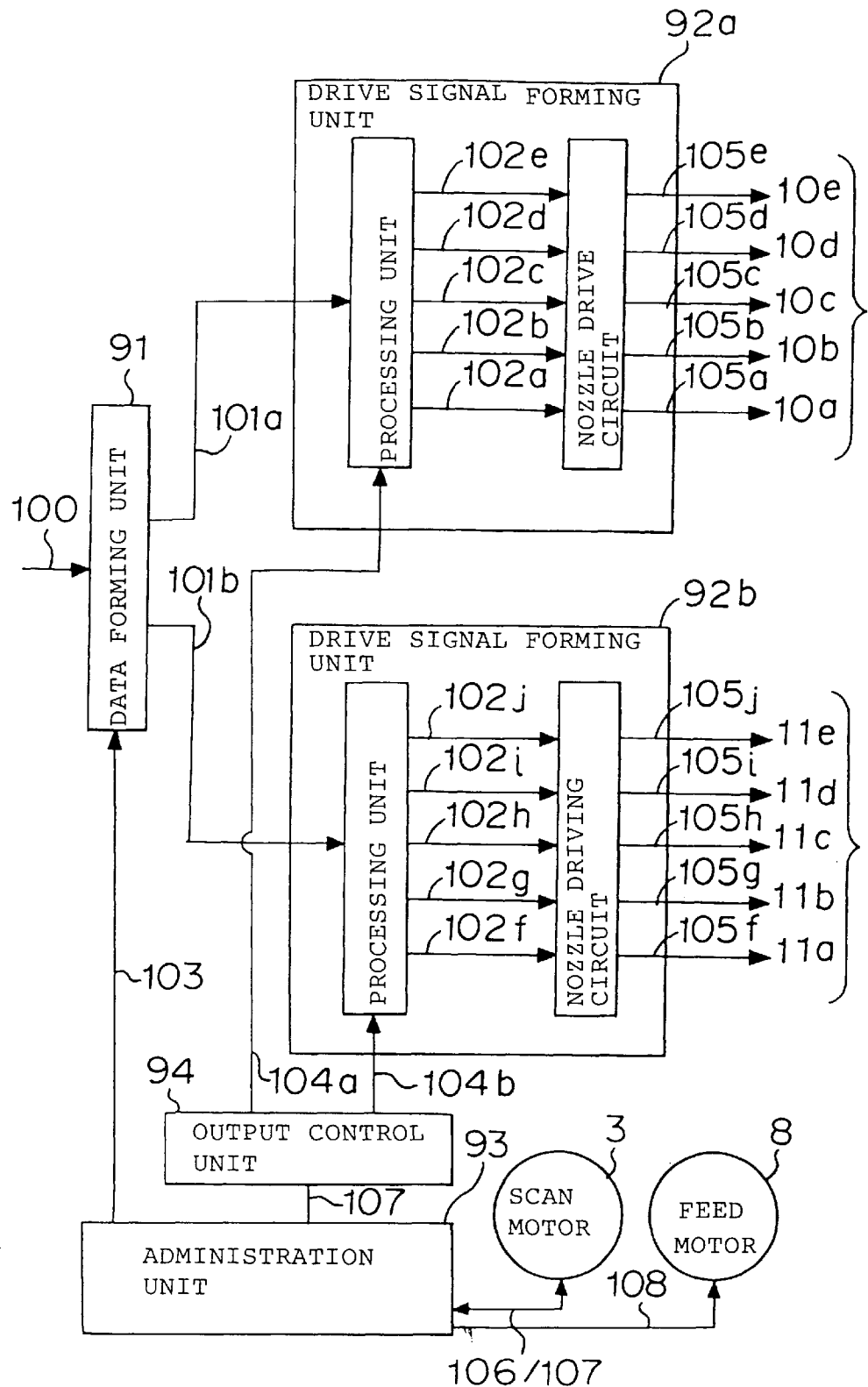
FIG. 28 is a functional block diagram of controlling means as shown by FIG. 27.
Figure 29:
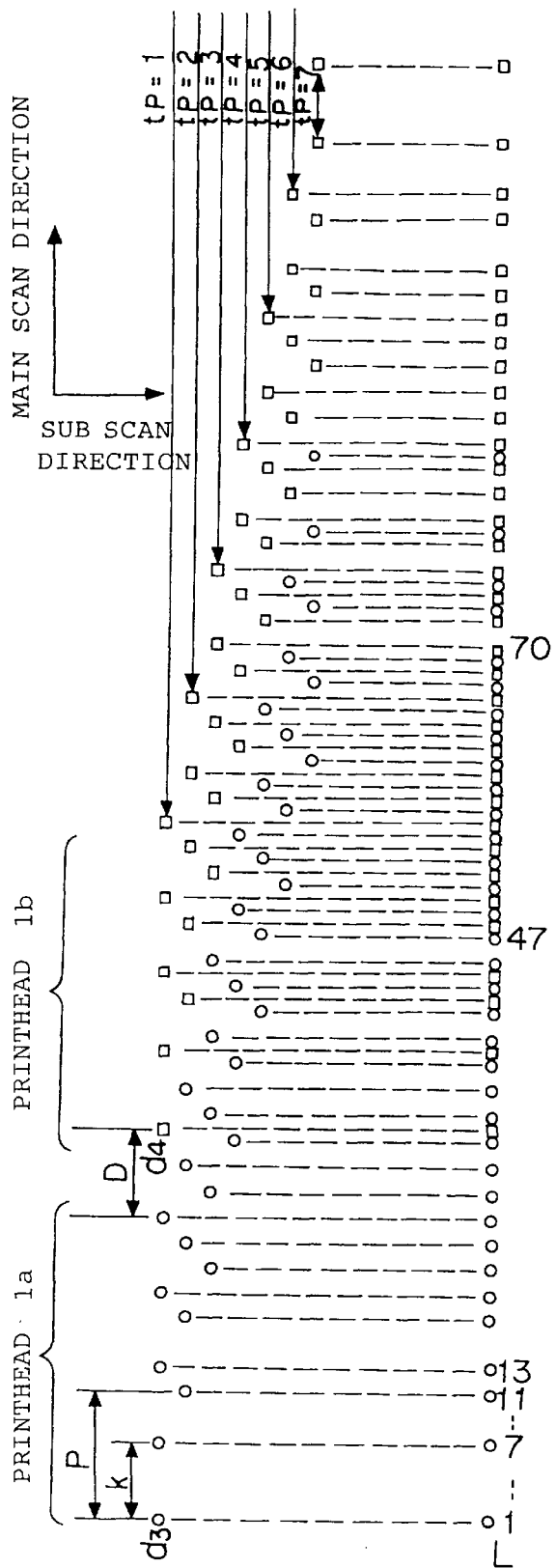
FIG. 29 is a diagram for explaining a print result in controlling printing operation of the controlling means shown by FIG. 27.

As illustrated by FIG. 28, the control means 9a is constituted similar to the control means 9 in FIG. 24 except provision of an output control unit 94 that is installed in addition to the administration unit 93. The output control unit 94 measures the signal 107 inputted by the administration unit 93 for detecting the amount of movement of the printheads 1a and 1b in the main scan direction by monitoring the rotational angle of the scan motor and outputs to the drive signal forming units 92a and 92b the instruction signals 104a and 10b instructing to which nozzles ink is to be outputted at every time where the printheads 1a and 1b are moved by 10 dots. Further, as illustrated by FIG. 29, according to a print result in the control operation of printing (m=2, n=5, k=6, D=7 and P=10), a printed dot contiguous to a printed dot $d_3$ or $d_4$ in the main scan direction, is printed by a nozzle that is always different from a nozzle for printing the printed dot $d_3$ or $d_4$ whereby a print result the same as that in the interlace printing is provided. Further, the actual effective print region is a print line L=47 and thereafter and the image printing is conducted only with respect to the effective print region by controlling print data of the respective nozzles by the instruction signals 104a and 104b such that dots are not printed with respect to print lines prior to L=47.

The multiple element printer according to the above-described embodiment adopts a system (high-density printing system by controlling printing operation) where the printheads of a number m (m=k/j, j is an integer of 2or more) each arranged with the printing elements of a number n at intervals of k dots (k and n are integers mutually prime with each other), are arranged in the main scan direction such that an interval between an nth printing element of a first printhead and a 1st printing element of a second printhead contiguous to the first printhead, is D dots (D and k are integers mutually prime with each other), and the respective printing elements of the printheads are driven at every time where the printheads are moved in the main scan direction by a distance corresponding to P dots (P=n×m) and the receiving medium is fed by the feed amount of 1 dot at every time where the printheads are moved in the main scan direction.

Figure 30:
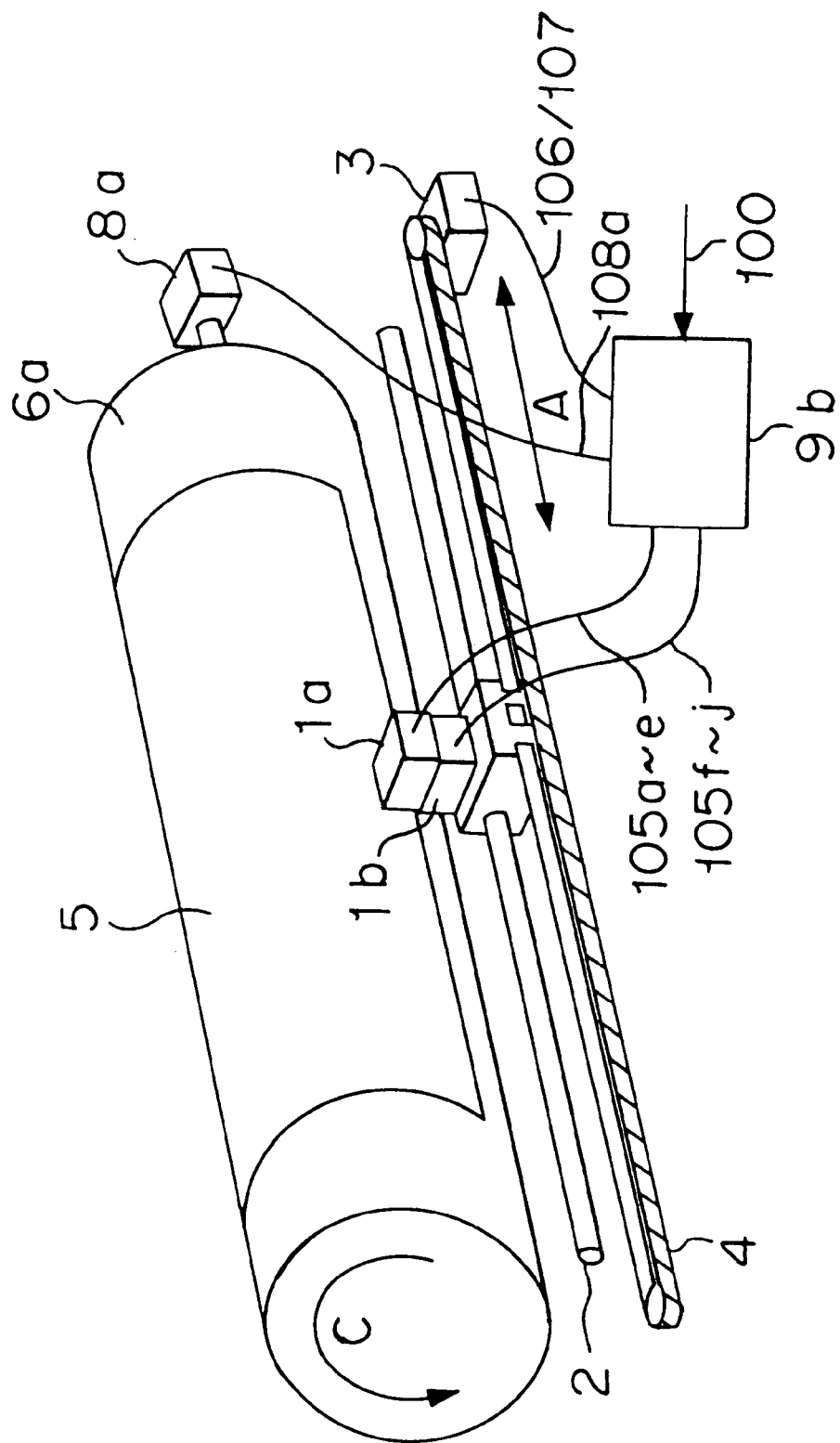
FIG. 30 is a constitutional view showing other embodiment of the present invention.

Further, the control means 9 in Embodiment 9 of the present invention illustrated by FIG. 22 may be constituted as a control means 9b as illustrated by FIG. 30. According to the operation of the control means 9b, a drum 6a fixed to a stationary member, not illustrated, and rotating in an arrow mark C direction and a drum drive motor 8a driven by a drum motor drive signal 108a for rotating the drum 6a in C direction at substantially a constant high speed are installed in place of the feed rollers 6 and 7 and the feed motor 8, when the printheads 1a and 1b has ejected ink whereby first (t=1) image printing has been finished, the drum 6a is rotated in C direction by an angle corresponding to a constant distance on the periphery (one periphery+P dots), the operation of ejecting ink is repeated until 1 print line of image printing is finished and when the 1 print line of image printing has been finished, the printheads 1a and 1b are moved by the scan motor 3 to a successive print line (1 dot) and the above-described control operation of printing is repeated until printing of all the information data are finished. According to this constitution, the receiving medium 5 can be moved at a higher speed by using the drum capable of rotating at high speed and the feed accuracy can be promoted due to a small load variation in feed the receiving medium by which the image printing can be conducted at a higher speed.

Figure 31:
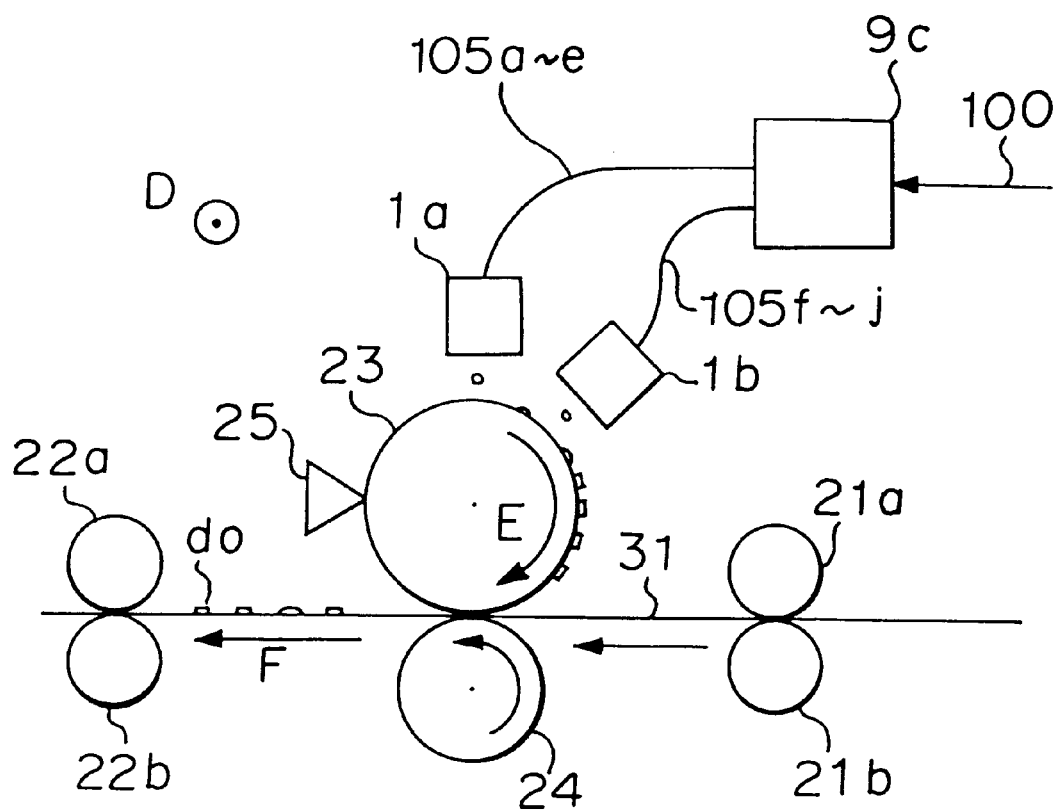
FIG. 31 is a constitutional view of a multiple element printer showing other embodiment of the present invention.

As illustrated by FIG. 31, according to a multiple element printer of an embodiment of the present invention, the printheads 1a and 1b correspond to those in FIG. 22 of the above-described embodiment. Feed rollers 21a and 21b and eject rollers 22a and 22b feed and eject the receiving medium 31. Print image is formed on a print roller 23 as an intermediate transfer medium by ejecting ink on a surface thereof by the printheads 1a and 1b. A transfer roller 24 forms final printed dots $d_0$ on the receiving medium 31 for transfer printed dots formed on the print roller 23 by pressing the transfer roller 24. A cleaning unit 25 cleans the surface by absorbing ink remaining on the print roller 23 after the transfer operation. According to the operation of the control means 9c, when a first image printing operation has been finished by the printheads 1a and 1b scanning in the main scan direction in accordance with a signal for detecting the amount of movement of the printheads in the main scan direction by monitoring the rotational angle by a driving scan motor, not illustrated, the receiving medium 31 is fed between the print roller 23 rotated by an angle corresponding to a constant distance of P dots on the periphery by a driving feed motor, not illustrated, and the transfer roller 24 that is rotated by a speed and a feed amount in synchronism with the peripheral speed and the rotated angle of the print roller 23, and printing element drive signals formed based on inputted information data are outputted to the printheads 1a and 1b. According to the constitution, even if ink having poor absorbability with respect to the receiving medium is used, the image printing can be carried out with certainty by a pressing force on the receiving medium 31 for transferring the printed dots after the printed dots have been formed by ejecting ink on the surface of the print roller 23 by which choice of ink for providing higher quality image can be diversified.

Incidentally, an explanation has been given of the embodiment of the present invention illustrated by FIG. 31 such that the printheads 1a and 1b are arranged in the feed direction of the receiving medium (sub scan direction), however, they may naturally be arranged in a direction of print lines orthogonal to the feed direction of the receiving medium (main scan direction).

Additionally, although an explanation has been given of the printheads 1a and 1b in the case of k=6, n=5 and m=2 in the embodiments of the present invention illustrated by FIG. 22, FIG. 27, FIG. 30 and FIG. 31, k, n and m may be any values so far as the above-described conditions for arranging the printing elements are satisfied and the printheads are naturally applicable to a color system. Although an explanation has been given of examples of using ink jet heads as groups of printing elements, other groups of printing elements capable of forming dots on a receiving medium, such as thermal heads may be used.

As described above, according to one aspect of the present invention, there is provided a multiple element printer in which N of printing elements are arranged at intervals of k dots where k and N are positive integers mutually primer with each other in a direction of feeding the receiving medium, a receiving medium is moved by a distance of P dots where N=P+1, in the direction of feeding the receiving medium at every printing and scanning of the printhead in a direction of printing lines by controlling means and printing element drive signals for driving the respective elements based on information data by printing element drive signal forming means such that a 1st one of the printing elements and an Nth one of the printing elements alternately print the dots at odd ordinal numbers and the dots at even ordinal numbers on substantially the same print lines. Accordingly, occurrence of streaks is prevented even if an error is caused in transport accuracy of the receiving medium and accuracy of attaching the printhead in the multiple element printer and accordingly, adverse influence on printed images is restrained and images having stable image quality are obtained.

According to another aspect of the present invention, there is provided a multiple element printer in which dot diameters of the 1st one of the printing elements and the Nth one of the printing elements of the printhead are made adjustable in accordance with values of the printing element drive signals. Then, in addition to an effect achieved by alternately printing the dots at odd ordinal numbers and the dots at even ordinal numbers on substantially the same print lines by the 1st one of the printing elements and the Nth one of the printing elements, the dot diameters of the 1st one of the printing elements and Nth one of the printing elements are properly set. In this way, the effect of restraining occurrence of streaks due to an error in feeding the receiving medium in the sub scan direction is more promoted and printed images having high quality are obtained.

According to another aspect of the present invention, there is provided a multiple element printer in which the values of the plurality of printing element drive signals stored in storing means by inputting means, are instructed, and dot diameter setting means sets the values of the printing element drive signals in accordance with an instruction of the inputting means. Accordingly, the set values of different dot diameters sizes can selectively set by which occurrence of streaks due to an error in feeding the receiving medium in the sub scan direction can be restrained and an adjusting operation for preventing the occurrence of streaks can simply be conducted.

According to another aspect of the present invention, there is provided a multiple element printer in which the values of the plurality of printing element drive signals are stored in storing means and dot diameter setting means sets different values of the printing element drive signals stored in the storing means at every time of printing a predetermined number of the print lines when the receiving medium is instructed to print. Accordingly, a test printing in which dot diameter sizes are changed and a test printing of printing data by constant width can be carried out in respect of one dot diameter size. In this way an operation of adjusting image quality can more efficiently be performed and images having excellent quality can simply be obtained.

According to another aspect of the present invention, there is provided a multiple element in which N of printing elements are arranged in the printhead at intervals of k dots where k and N are positive integers mutually primer with each other, in a direction of print lines orthogonal to a direction of feeding a receiving medium, the printhead is moved by P dots where N=P+1 in a direction of feeding the receiving medium at every feeding operation of the receiving medium in the direction of feeding the receiving medium by controlling means and printing element drive signal for driving the respective elements are outputted to the printhead based on information data by printing element drive signal forming means such that a 1st one of the printing elements and an Nth one of the printing elements alternately print the dots of odd ordinal numbers and the dots of even ordinal numbers. Accordingly, the multiple element printer prevents occurrence of streaks even if an error is caused in feed accuracy of the receiving medium or accuracy of attaching the printhead and accordingly, adverse influence thereof can be restrained in printed images and images having stable image quality can be obtained.

According to another aspect of the present invention, there is provided a multiple element printer in which an intermediate transfer medium is moved in the direction of feeding the receiving medium by a distance of P dots at every time of scanning a printhead, the printhead prints dots on a surface of the intermediate transfer medium in place of the surface of the receiving medium and the dots printed on the surface of the intermediate transfer medium are transferred onto the receiving medium by placing the surface of the intermediate transfer medium to the receiving medium. Accordingly, even if ink having poor absorbability in respect of the receiving medium is used, image printing in respect of receiving medium can firmly be carried out by the pressing force by which choice of ink for obtaining print images having higher image quality can be diversified.

According to another aspect of the present invention, there is provided a multiple element printer in which N of printing elements are arranged in a printhead at intervals of k dots where k and N are positive integers mutually prime with each other, in a direction of feeding a receiving medium, first driving means is controlled by controlling means such that the receiving medium is moved by a distance of N dots at every printing and scanning of a printhead in a direction of print lines, printing element drive signals for driving the respective printing elements to the printhead based on information data by printing element drive signal forming means and sizes of dot diameters printed by a 1st one of printing elements and an Nth one of the printing elements are adjusted by dot diameter adjusting means. Accordingly, even if the multiple element printer carries out interlace printing and an error is caused in feed accuracy of the receiving medium or accuracy in attaching the printhead, occurrence of streaks is prevented, adverse influence thereof can be prevented in printed images and images having stable image quality can be obtained.

According to another aspect of the present invention, there is provided a multiple element printer in which the dot diameter adjusting means adjusts the sizes of the dot diameters printed by the 1st one of the printing elements and the Nth one of the printing elements, and adjust sizes of dot diameters printed by a 2nd one of the printing elements and a (N−1)th one of the printing elements. Accordingly, the sizes of the dot diameters printed by the 2nd one and the (N−1)th one of the printed elements can be changed in a direction reverse to a direction of changing the sizes of dot diameters of dots printed by the 1st one and the Nth one of the print elements by which occurrence of streaks can more firmly be restrained and printed images having higher quality can be obtained.

According to another aspect of the present invention, there is provided a method of adjusting a multiple element printer for printing information by scanning in a direction of printing lines a printhead arranged with N of printing elements for printing dots on a surface of a receiving medium at intervals of k dots where k and N are positive integers mutually prime with each other, in a direction of moving the receiving medium by moving the receiving medium by a distance of P dots where N=P+1 at every printing and scanning of the printhead in the direction of the print lines orthogonal to the direction of moving the printhead, the method comprising a printing step of printing a predetermined number of lines by the respective printing elements such that a 1st one and an Nth one of the printing elements alternately print the dots of odd ordinal numbers and the dots of even ordinal numbers substantially on a same print line and an adjusting step of adjusting dot sizes of the 1st one and the Nth one of the printing elements. Accordingly, in addition to an effect of alternately printing the dots of odd ordinal numbers and dots of even ordinal numbers on substantially the same print line by the 1st one of the print elements and the Nth one of the printing elements, the dot diameters of the 1st one of the printing elements and the Nth one of the print elements are properly set by which an effect of restraining occurrence of streaks due to an error in feeding the receiving medium in the sub scan direction can be promoted and printed images having high quality can be obtained.

According to another aspect of the present invention, there is provided a method of adjusting a multiple element printer for printing information by scanning in a direction of print lines a printhead arranged with N of printing elements for printing dots on a surface of a receiving medium at intervals of k dots where k and N are positive integers mutually prime with each other, in a direction of moving the receiving medium by moving the receiving medium by a distance of P dots where N=P+1 at every printing and scanning of printhead in the direction of the print lines orthogonal to the direction of feeding the printhead, the method comprising a printing step of printing a predetermined number of lines by the respective printing elements and an adjusting step of adjusting dot sizes of a 1st one of the printing elements and an Nth one of the printing elements. Accordingly, even if the multiple element printer carries out interlace printing and an error is caused in feed accuracy of the receiving medium and accuracy in attaching the printhead, occurrence of streaks can be avoided so that images having stable quality can be obtained.

According to another aspect of the present invention, a multiple element printer adopts a high density printing system by controlling printing operation such that printheads of a number m formed by dividing k by an integer j equal to or larger than 2, each including printing elements of a number n arranged in the sub scan direction or the main scan direction at intervals of k dots where k and N are integers mutually prime with each and where an Nth one of the printing elements of a first one of the printheads and a 1st one of the printing elements of a second one of the printheads contiguous to the first one of the printheads are arranged in the sub scan direction or the main scan direction at an interval of D dots where D and k are integers mutually prime with each other, are arranged, and a receiving medium is fed by a feed amount of P dots where P=n×m and the respective printing elements of the printheads are driven at every moving of the printheads in the main scan direction, or the respective printing elements of the printheads are driven at every moving of the printheads by a distance corresponding to P dots where P=n×m in the main scan direction and the receiving medium is fed by a feed amount of 1 dot at every moving of the printheads in the main scan direction. Accordingly, in comparison with the conventional high density printing system in which a plurality of printing elements are arranged in the sub scan direction at intervals each of a printing resolution multipled by an integer, the printhead is scanned at plural times in the main scan direction and a printhead is fed in the sub scan direction by a unit of a minimum resolution, or the conventional interlace printing system by which a disturbance of image quality of images due to a dispersion of printing elements is reduced by using printing elements for printing contiguous lines which are different from each other and a dispersion in feed accuracy of a receiving medium is made uniform in respect of a total of a print region, the present invention provides stable image quality by using printed elements for printing contiguous lines which are different from each other and making uniform the dispersion of the printing elements and a fabrication dispersion of the respective printheads. Furthermore, high-speed printing can be carried out by decreasing the amount in the sub scan direction by a factor of a number of the printheads. Also, a system of increasing the number of the printing elements by high density information of the printing elements or prolongation of the printhead which deteriorates the fabrication yield, is not adopted by which the cost is reduced. In addition to the above-described effects, the following effects are achieved by the respective aspects of the present invention.

(1) High-speed printing can be carried out by shortening a printing time period in one scanning in the main scan direction. Also, a time period required for one printing element after printing an image until printing successive image, is only a time period for running the printhead corresponding to an interval of a feed amount (P dots) of the receiving medium and accordingly, the cost can be reduced without especially using high-speed printing elements.

(2) The receiving medium can be fed at a higher speed by using a drum capable of rotating at high speed and feed accuracy can be promoted due to a small variation in load in feeding the receiving medium.

(3) Even if ink having poor absorbability in respect of receiving medium is used, printed dots are formed once by ejecting ink on a surface of a print roller and thereafter, the printed dots are transferred onto a receiving medium by a pressing force applied on the receiving medium by which image printing can be carried out firmly and choice of ink providing high image quality printing can be diversified.

What is claimed is:

1. A multiple element printer comprising:

a printhead having N printing elements arranged along a recording medium feed direction at intervals of k dots, where k and N are positive integers which cannot be divided by each other without remainder;

first driving means for feeding a receiving medium along the feed direction;

second driving means for moving said printhead in a print line direction, orthogonal to the feed direction;

data forming means for outputting previously stored print data;

printing element drive signal forming means for outputting printing element drive signals to said printhead for driving the respective printing elements based on the print data such that a first printing element and an Nth printing element alternately print dots along substantially the same print line; and controlling means for controlling said first driving means to move the receiving medium by a distance of P dots, where N=P+1, after each movement of said printhead along the print line direction.

2. The multiple element printer according to claim 1, wherein said printhead adjusts dot diameters of the first and Nth printing elements in accordance with values of the printing elements drive signals; and said multiple element printer further comprises:

dot diameter setting means for setting values of the printing element drive signals.

3. The multiple element printer according to claim 2, further comprising:

storing means for storing the printing element drive signal values; and inputting means for instructing the values of the printing element drive signals stored in the storing means; and wherein said dot diameter setting means sets the values of the printing element drive signals in accordance with an instruction of said inputting means.

4. The multiple element printer according to claim 2, further comprising:

storing means for storing the printing element drive signal values; and wherein said dot diameter setting means sets values of the printing element drive signals stored in said storing means every time a predetermined number of the print lines are printed.

5. The multiple element printer according to claim 1, further comprising:

an intermediate transfer medium which moves in the feed direction by a distance of P dots after movement of said printhead along the print line direction; wherein said printhead prints dots on a surface of the intermediate transfer medium; and wherein said multiple element printer further comprises:

transfer means for transferring dots printed on the surface of the intermediate transfer medium onto the receiving medium by pressing the surface of the intermediate transfer medium to the receiving medium.

6. A multiple element printer comprising:

a printhead having N for printing elements arranged along a recording medium feed direction at intervals of k dots, where k and N are positive integers which cannot be divided by each other without remainder, in a direction of print lines orthogonal to the direction;

first driving means for driving a receiving medium in the feed direction;

second driving means for moving the printhead in the print line direction;

a data forming means for outputting previously stored print data;

printing element drive signal forming means for outputting printing element drive signals to said printhead for driving the respective printing elements based on the print data such that a first and an Nth printing element alternately print dots along substantially the same line in the feed direction; and controlling means for controlling said second driving means such that said printhead is moved by P dots, where N=P+1, after each feeding operation of the receiving medium in feed the direction.

7. A method of controlling a multiple element printer for printing information by moving a printhead having N printing elements arranged along a recording medium feed direction at intervals of k dots, where k and N are positive integers which cannot be divided by each other without remainder, and by moving the receiving medium by a distance of P dots, where N=P+1, after each movement of said printhead along the print line direction, said method comprising:

printing a predetermined number of lines using the respective printing elements of said printhead such that a first printing element and an Nth printing element alternatively print dots along substantially the same print line; and adjusting dot sizes of the first and the Nth printing elements.

* * * * *